(12) United States Patent
Das et al.

(10) Patent No.: US 9,119,220 B2
(45) Date of Patent: Aug. 25, 2015

(54) METHODS AND APPARATUS FOR COMMUNICATING BACKLOG RELATED INFORMATION

(75) Inventors: Arnab Das, Summit, NJ (US); Sundeep Rangan, Jersey City, NJ (US); Yunus Hussain, Bridgewater, NJ (US); Samel Celebi, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 2110 days.

(21) Appl. No.: 11/610,189

(22) Filed: Dec. 13, 2006

(65) Prior Publication Data
US 2007/0258365 A1 Nov. 8, 2007

Related U.S. Application Data

(63) Continuation-in-part of application No. 11/333,792, filed on Jan. 17, 2006.

(60) Provisional application No. 60/752,973, filed on Dec. 22, 2005.

(51) Int. Cl.
*H04B 1/04* (2006.01)
*H04W 72/12* (2009.01)

(52) U.S. Cl.
CPC ...... *H04W 72/1284* (2013.01); *H04W 72/1221* (2013.01); *H04W 72/1252* (2013.01)

(58) Field of Classification Search
CPC .......................................... H04B 1/04
USPC .............. 455/422.1, 424, 425, 450, 452, 509, 455/67.11, 67.13, 452.1, 452.2, 453, 500; 370/338, 350, 352, 465, 468, 349, 329
See application file for complete search history.

(56) References Cited

U.S. PATENT DOCUMENTS

| 4,631,720 A | 12/1986 | Koeck |
| 4,660,196 A | 4/1987 | Gray et al. |

(Continued)

FOREIGN PATENT DOCUMENTS

| CL | 3603-2006 | 12/2006 |
| CL | 3604-2006 | 12/2006 |

(Continued)

OTHER PUBLICATIONS

Gunnarson, F., et al.: "Uplink Admission Control in WCDMA Based on Relative Load Estimates", IEEE International Conference on Communications, vol. 1, pp. 3091-3095, IEEE, New York, NY USA (Apr. 28, 2002).

(Continued)

*Primary Examiner* — Thanh Le
(74) *Attorney, Agent, or Firm* — Ashish L. Patel

(57) ABSTRACT

Methods and apparatus for efficient communication of backlog information, e.g., backlog information indicating amounts of uplink traffic waiting to transmitted by a wireless terminal are described. Delta backlog reports are used in addition to absolute backlog reports, thus reducing control signaling overhead, at least some information communicated in a delta backlog report being referenced with respect to a previously transmitted backlog report. A base station uses received backlog information from wireless terminals in determining scheduling of uplink traffic channel segments In some embodiments, the absolute backlog report uses a first fixed size report format, while the delta backlog report using a second fixed size report format, said second size being different from said first fixed size.

27 Claims, 18 Drawing Sheets

(56) References Cited

U.S. PATENT DOCUMENTS

| | | | |
|---|---|---|---|
| 4,679,244 A | 7/1987 | Kawasaki et al. |
| 4,833,701 A | 5/1989 | Comroe et al. |
| 5,128,938 A | 7/1992 | Borras |
| 5,203,013 A | 4/1993 | Breeden et al. |
| 5,387,905 A | 2/1995 | Grube et al. |
| 5,434,848 A | 7/1995 | Chimento, Jr. et al. |
| 5,461,645 A | 10/1995 | Ishii |
| 5,465,389 A | 11/1995 | Agrawal et al. |
| 5,506,865 A | 4/1996 | Weaver, Jr. |
| 5,537,414 A | 7/1996 | Takiyasu et al. |
| 5,579,307 A | 11/1996 | Richetta et al. |
| 5,732,328 A | 3/1998 | Mitra et al. |
| 5,835,847 A | 11/1998 | Gilmore et al. |
| 5,867,478 A | 2/1999 | Baum et al. |
| 5,898,925 A | 4/1999 | Honkasalo et al. |
| 5,914,950 A | 6/1999 | Tiedemann et al. |
| 5,915,221 A | 6/1999 | Sawyer et al. |
| 5,923,650 A | 7/1999 | Chen et al. |
| 5,933,421 A | 8/1999 | Alamouti et al. |
| 5,940,771 A | 8/1999 | Gollnick et al. |
| 5,966,657 A | 10/1999 | Sporre |
| 5,966,662 A | 10/1999 | Murto |
| 5,978,657 A | 11/1999 | Suzuki |
| 5,999,534 A | 12/1999 | Kim |
| 6,002,676 A | 12/1999 | Fleming |
| 6,004,276 A | 12/1999 | Wright et al. |
| 6,026,081 A | 2/2000 | Hamabe et al. |
| 6,028,842 A | 2/2000 | Chapman et al. |
| 6,028,843 A | 2/2000 | Delp et al. |
| 6,035,000 A | 3/2000 | Bingham et al. |
| 6,069,871 A | 5/2000 | Sharma et al. |
| 6,070,072 A | 5/2000 | Dorenbosch et al. |
| 6,073,025 A | 6/2000 | Chheda et al. |
| 6,075,025 A | 6/2000 | Bishop et al. |
| 6,122,270 A | 9/2000 | Whinnett et al. |
| 6,128,506 A | 10/2000 | Knutsson et al. |
| 6,131,016 A | 10/2000 | Greenstein et al. |
| 6,141,565 A | 10/2000 | Feuerstein et al. |
| 6,169,896 B1 | 1/2001 | Sant et al. |
| 6,173,005 B1 | 1/2001 | Kotzin et al. |
| 6,181,948 B1 | 1/2001 | Kondo |
| 6,201,793 B1 | 3/2001 | Chen et al. |
| 6,205,129 B1 | 3/2001 | Esteves et al. |
| 6,215,791 B1 | 4/2001 | Kim |
| 6,236,646 B1 | 5/2001 | Beming et al. |
| 6,256,478 B1 | 7/2001 | Allen et al. |
| 6,259,927 B1 | 7/2001 | Butovitsch et al. |
| 6,263,392 B1 | 7/2001 | McCauley |
| 6,298,233 B1 | 10/2001 | Souissi et al. |
| 6,308,080 B1 | 10/2001 | Burt et al. |
| 6,310,857 B1 | 10/2001 | Duffield et al. |
| 6,311,065 B1 | 10/2001 | Ushiki et al. |
| 6,374,085 B1 | 4/2002 | Saints et al. |
| 6,377,583 B1 | 4/2002 | Lyles et al. |
| 6,377,955 B1 | 4/2002 | Hartmann et al. |
| 6,405,047 B1 | 6/2002 | Moon |
| 6,414,946 B1 | 7/2002 | Satou et al. |
| 6,445,917 B1 | 9/2002 | Bark et al. |
| 6,453,151 B1 * | 9/2002 | Kiang et al. ............... 455/67.11 |
| 6,493,539 B1 | 12/2002 | Falco et al. |
| 6,526,281 B1 | 2/2003 | Gorsuch et al. |
| 6,538,986 B2 | 3/2003 | Isaksson et al. |
| 6,545,999 B1 | 4/2003 | Sugita |
| 6,553,336 B1 | 4/2003 | Johnson et al. |
| 6,590,890 B1 | 7/2003 | Stolyar et al. |
| 6,597,914 B1 | 7/2003 | Silventoinen et al. |
| 6,600,903 B1 | 7/2003 | Lilja et al. |
| 6,609,007 B1 | 8/2003 | Eibling et al. |
| 6,621,808 B1 | 9/2003 | Sadri |
| 6,625,133 B1 | 9/2003 | Balachandran et al. |
| 6,662,024 B2 | 12/2003 | Walton et al. |
| 6,671,512 B2 | 12/2003 | Laakso et al. |
| 6,680,909 B1 | 1/2004 | Bansal et al. |
| 6,697,417 B2 | 2/2004 | Fernandez-Corbaton et al. |
| 6,710,651 B2 | 3/2004 | Forrester |
| 6,742,020 B1 | 5/2004 | Dimitroff et al. |
| 6,745,003 B1 | 6/2004 | Maca et al. |
| 6,745,044 B1 | 6/2004 | Holtzman et al. |
| 6,751,187 B2 | 6/2004 | Walton et al. |
| 6,771,934 B2 | 8/2004 | Demers et al. |
| 6,788,963 B2 | 9/2004 | Laroia et al. |
| 6,798,761 B2 | 9/2004 | Cain et al. |
| 6,804,289 B2 | 10/2004 | Takahashi |
| 6,804,521 B2 | 10/2004 | Tong et al. |
| 6,816,476 B2 | 11/2004 | Kim et al. |
| 6,836,673 B1 | 12/2004 | Trott |
| 6,865,168 B1 | 3/2005 | Sekine |
| 6,889,056 B2 | 5/2005 | Shibutani |
| 6,892,071 B2 | 5/2005 | Park et al. |
| 6,895,005 B1 | 5/2005 | Malin et al. |
| 6,895,364 B2 | 5/2005 | Banfer |
| 6,901,268 B2 | 5/2005 | Chang et al. |
| 6,901,270 B1 | 5/2005 | Beach |
| 6,904,016 B2 | 6/2005 | Kuo et al. |
| 6,912,405 B2 | 6/2005 | Hiramatsu et al. |
| 6,917,607 B1 | 7/2005 | Yeom et al. |
| 6,940,827 B2 | 9/2005 | Li et al. |
| 6,954,643 B2 | 10/2005 | Petrus et al. |
| 6,957,072 B2 | 10/2005 | Kangras et al. |
| 6,967,937 B1 | 11/2005 | Gormley |
| 6,968,156 B2 | 11/2005 | Sugaya et al. |
| 7,006,841 B2 | 2/2006 | Monogioudis et al. |
| 7,024,460 B2 | 4/2006 | Koopmans et al. |
| 7,027,782 B2 | 4/2006 | Moon et al. |
| 7,031,983 B2 | 4/2006 | Israni et al. |
| 7,034,254 B2 | 4/2006 | Grabowski et al. |
| 7,039,029 B2 | 5/2006 | Lee et al. |
| 7,043,254 B2 | 5/2006 | Chawla et al. |
| 7,047,009 B2 | 5/2006 | Laroia et al. |
| 7,054,643 B2 | 5/2006 | Trossen et al. |
| 7,061,885 B2 | 6/2006 | Kurtz |
| 7,092,672 B1 | 8/2006 | Pekonen et al. |
| 7,120,123 B1 | 10/2006 | Quigley et al. |
| 7,120,448 B2 | 10/2006 | Brouwer et al. |
| 7,123,910 B2 | 10/2006 | Lucidarme et al. |
| 7,139,536 B2 | 11/2006 | Chiu |
| 7,142,548 B2 | 11/2006 | Fong et al. |
| 7,146,172 B2 | 12/2006 | Li et al. |
| 7,158,796 B2 | 1/2007 | Tiedemann, Jr. et al. |
| 7,161,909 B2 | 1/2007 | Sharma |
| 7,162,203 B1 | 1/2007 | Brunner et al. |
| 7,164,883 B2 | 1/2007 | Rappaport et al. |
| 7,197,025 B2 | 3/2007 | Chuah |
| 7,203,493 B2 | 4/2007 | Fujii et al. |
| 7,212,821 B2 | 5/2007 | Laroia et |
| 7,218,948 B2 | 5/2007 | Laroia et al. |
| 7,245,935 B2 | 7/2007 | Lin |
| 7,260,054 B2 | 8/2007 | Olszewski et al. |
| 7,269,406 B2 | 9/2007 | Qi |
| 7,277,709 B2 | 10/2007 | Vadgama |
| 7,277,737 B1 | 10/2007 | Vollmer et al. |
| 7,280,814 B2 | 10/2007 | Austin et al. |
| 7,283,559 B2 | 10/2007 | Cho et al. |
| 7,283,836 B2 | 10/2007 | Hwang et al. |
| 7,299,277 B1 | 11/2007 | Moran et al. |
| 7,317,921 B2 | 1/2008 | Mueckenheim et al. |
| 7,319,680 B2 | 1/2008 | Cho |
| 7,321,563 B2 | 1/2008 | Kim et al. |
| 7,340,267 B2 | 3/2008 | Budka et al. |
| 7,349,667 B2 | 3/2008 | Magee et al. |
| 7,356,635 B2 | 4/2008 | Woodings et al. |
| 7,362,702 B2 | 4/2008 | Terrell et al. |
| 7,382,755 B2 | 6/2008 | Dugad et al. |
| 7,395,058 B1 | 7/2008 | Kalofonos et al. |
| 7,397,803 B2 | 7/2008 | Love et al. |
| 7,400,901 B2 | 7/2008 | Kostic et al. |
| 7,412,265 B2 | 8/2008 | Chen et al. |
| 7,418,260 B2 | 8/2008 | Lucidarme |
| 7,430,206 B2 | 9/2008 | Terry et al. |
| 7,430,207 B2 | 9/2008 | Wu et al. |
| 7,430,420 B2 | 9/2008 | Derakhshan et al. |
| 7,447,148 B2 | 11/2008 | Gao et al. |
| 7,463,577 B2 | 12/2008 | Sudo et al. |
| 7,486,620 B2 | 2/2009 | Seol |

(56) References Cited

U.S. PATENT DOCUMENTS

| | | |
|---|---|---|
| 7,486,638 B2 | 2/2009 | Ofuji et al. |
| 7,502,614 B2 | 3/2009 | Uchida et al. |
| 7,508,792 B2 | 3/2009 | Petrovic et al. |
| 7,510,828 B2 | 3/2009 | Lynn et al. |
| 7,512,076 B2 | 3/2009 | Kwon et al. |
| 7,512,185 B2 | 3/2009 | Sharon et al. |
| 7,519,013 B2 | 4/2009 | Destino et al. |
| 7,519,033 B2 | 4/2009 | Soomro |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,558,235 B2 | 7/2009 | Lester et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,743,284 B1 | 6/2010 | Taylor et al. |
| 8,040,831 B2 | 10/2011 | Kurtz et al. |
| 8,325,621 B2 | 12/2012 | Simonsson et al. |
| 8,989,084 B2 | 3/2015 | Hande et al. |
| 2001/0007552 A1 | 7/2001 | Schiff et al. |
| 2001/0036181 A1 | 11/2001 | Rogers |
| 2001/0046878 A1 | 11/2001 | Chang et al. |
| 2001/0055293 A1 | 12/2001 | Parsa et al. |
| 2002/0012326 A1 | 1/2002 | Chang et al. |
| 2002/0031105 A1 | 3/2002 | Zeira et al. |
| 2002/0037729 A1 | 3/2002 | Kitazawa et al. |
| 2002/0045448 A1 | 4/2002 | Park et al. |
| 2002/0049040 A1 | 4/2002 | Sugaya et al. |
| 2002/0075835 A1 | 6/2002 | Krishnakumar et al. |
| 2002/0077140 A1 | 6/2002 | Monogioudis et al. |
| 2002/0080967 A1 | 6/2002 | Abdo et al. |
| 2002/0082011 A1 | 6/2002 | Fujii et al. |
| 2002/0085516 A1 | 7/2002 | Bridgelall |
| 2002/0093953 A1 | 7/2002 | Naim et al. |
| 2002/0107028 A1 | 8/2002 | Rantalainen et al. |
| 2002/0122431 A1 | 9/2002 | Cho et al. |
| 2002/0136195 A1 | 9/2002 | Kurtz et al. |
| 2002/0142788 A1 | 10/2002 | Chawla et al. |
| 2002/0143858 A1 | 10/2002 | Teague et al. |
| 2002/0147017 A1 | 10/2002 | Li et al. |
| 2002/0160802 A1 | 10/2002 | Hiramatsu et al. |
| 2002/0177452 A1 | 11/2002 | Ruutu et al. |
| 2002/0186678 A1 | 12/2002 | Averbuch et al. |
| 2003/0003921 A1 | 1/2003 | Laakso et al. |
| 2003/0007498 A1 | 1/2003 | Angle et al. |
| 2003/0012212 A1 | 1/2003 | Earnshaw et al. |
| 2003/0027587 A1 | 2/2003 | Proctor, Jr. et al. |
| 2003/0028606 A1 | 2/2003 | Koopmans et al. |
| 2003/0064737 A1 | 4/2003 | Eriksson et al. |
| 2003/0078067 A1 | 4/2003 | Kim et al. |
| 2003/0083069 A1 | 5/2003 | Vadgama |
| 2003/0095519 A1 | 5/2003 | Kuo et al. |
| 2003/0100269 A1 | 5/2003 | Lehtinen et al. |
| 2003/0114180 A1 | 6/2003 | Black et al. |
| 2003/0123396 A1 | 7/2003 | Seo et al. |
| 2003/0123410 A1 | 7/2003 | Youm |
| 2003/0139197 A1 | 7/2003 | Kostic et al. |
| 2003/0144042 A1 | 7/2003 | Weinfield et al. |
| 2003/0157899 A1 | 8/2003 | Trossen et al. |
| 2003/0161285 A1 | 8/2003 | Tiedemann et al. |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0193915 A1 | 10/2003 | Lee et al. |
| 2003/0198204 A1 | 10/2003 | Taneja et al. |
| 2003/0198206 A1 | 10/2003 | Cain et al. |
| 2003/0206541 A1 | 11/2003 | Yun et al. |
| 2003/0207691 A1 | 11/2003 | Chen |
| 2003/0207693 A1 | 11/2003 | Roderique |
| 2003/0214906 A1 | 11/2003 | Hu et al. |
| 2003/0214928 A1 | 11/2003 | Chuah et al. |
| 2003/0223354 A1 | 12/2003 | Olszewski et al. |
| 2004/0001429 A1 | 1/2004 | Ma et al. |
| 2004/0004954 A1 | 1/2004 | Terry et al. |
| 2004/0013103 A1 | 1/2004 | Zhang et al. |
| 2004/0057402 A1 | 3/2004 | Ramos et al. |
| 2004/0062206 A1 | 4/2004 | Soong et al. |
| 2004/0081089 A1 | 4/2004 | Ayyagari |
| 2004/0082344 A1 | 4/2004 | Moilanen et al. |
| 2004/0085936 A1 | 5/2004 | Gopalakrishnan et al. |
| 2004/0091026 A1 | 5/2004 | Nakayama |
| 2004/0111640 A1 | 6/2004 | Baum |
| 2004/0120411 A1 | 6/2004 | Walton et al. |
| 2004/0125776 A1 | 7/2004 | Haugli et al. |
| 2004/0127226 A1 | 7/2004 | Dugad et al. |
| 2004/0131007 A1 | 7/2004 | Smee et al. |
| 2004/0141466 A1 | 7/2004 | Kim et al. |
| 2004/0147262 A1 | 7/2004 | Lescuyer et al. |
| 2004/0147276 A1 | 7/2004 | Gholmieh et al. |
| 2004/0160922 A1 | 8/2004 | Nanda et al. |
| 2004/0162097 A1 | 8/2004 | Vijayan et al. |
| 2004/0166869 A1 | 8/2004 | Laroia et al. |
| 2004/0166886 A1 | 8/2004 | Laroia et al. |
| 2004/0166887 A1 | 8/2004 | Laroia et al. |
| 2004/0171401 A1 | 9/2004 | Balachandran et al. |
| 2004/0180658 A1 | 9/2004 | Uchida et al. |
| 2004/0184410 A1 | 9/2004 | Park |
| 2004/0192371 A1 | 9/2004 | Zhao et al. |
| 2004/0196802 A1 | 10/2004 | Bae et al. |
| 2004/0203717 A1 | 10/2004 | Wingrowicz et al. |
| 2004/0203981 A1 | 10/2004 | Budka et al. |
| 2004/0218617 A1 | 11/2004 | Sagfors |
| 2004/0223455 A1 | 11/2004 | Fong et al. |
| 2004/0224677 A1 | 11/2004 | Kuchibhotla et al. |
| 2004/0228313 A1 | 11/2004 | Cheng et al. |
| 2004/0233838 A1 | 11/2004 | Sudo et al. |
| 2004/0235510 A1 | 11/2004 | Elicegui et al. |
| 2004/0248518 A1 | 12/2004 | Kashiwase et al. |
| 2004/0248568 A1 | 12/2004 | Lucidarme et al. |
| 2004/0252662 A1 | 12/2004 | Cho et al. |
| 2004/0253996 A1 | 12/2004 | Chen et al. |
| 2004/0258040 A1 | 12/2004 | Joshi et al. |
| 2004/0259546 A1 | 12/2004 | Balachandran et al. |
| 2004/0264414 A1 | 12/2004 | Dorenbosch |
| 2004/0266474 A1 | 12/2004 | Petrus et al. |
| 2005/0003847 A1 | 1/2005 | Love et al. |
| 2005/0008892 A1 | 1/2005 | Yamamoto et al. |
| 2005/0037775 A1 | 2/2005 | Moeglein et al. |
| 2005/0047344 A1 | 3/2005 | Seol et al. |
| 2005/0047393 A1 | 3/2005 | Liu et al. |
| 2005/0047416 A1 | 3/2005 | Heo et al. |
| 2005/0053099 A1 | 3/2005 | Spear et al. |
| 2005/0058637 A1 | 3/2005 | Lynn et al. |
| 2005/0064821 A1 | 3/2005 | Hedberg et al. |
| 2005/0068922 A1 | 3/2005 | Jalali |
| 2005/0085197 A1 | 4/2005 | Laroia et al. |
| 2005/0099987 A1 | 5/2005 | Lester et al. |
| 2005/0111361 A1 | 5/2005 | Hosein |
| 2005/0118993 A1 | 6/2005 | Roux et al. |
| 2005/0122900 A1 | 6/2005 | Tuulos et al. |
| 2005/0128999 A1 | 6/2005 | Kwon et al. |
| 2005/0135320 A1 | 6/2005 | Tiedemann et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0157876 A1 | 7/2005 | Jeong et al. |
| 2005/0170782 A1 | 8/2005 | Rong et al. |
| 2005/0181732 A1 | 8/2005 | Kang et al. |
| 2005/0185632 A1 | 8/2005 | Draves et al. |
| 2005/0195765 A1 | 9/2005 | Sharon et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1 | 11/2005 | Choksi et al. |
| 2005/0250510 A1 | 11/2005 | Kaikkonen et al. |
| 2005/0250529 A1 | 11/2005 | Funnell et al. |
| 2005/0255873 A1 | 11/2005 | Zhang et al. |
| 2005/0259662 A1 | 11/2005 | Kim et al. |

(56) References Cited

U.S. PATENT DOCUMENTS

| | | |
|---|---|---|
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0018284 A1 | 1/2006 | Rudolf et al. |
| 2006/0019694 A1 | 1/2006 | Sutivong et al. |
| 2006/0034174 A1 | 2/2006 | Nishibayashi et al. |
| 2006/0040696 A1 | 2/2006 | Lin et al. |
| 2006/0045013 A1 | 3/2006 | Vannithamby et al. |
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0104240 A1 | 5/2006 | Sebire et al. |
| 2006/0120470 A1 | 6/2006 | Hwang et al. |
| 2006/0126497 A1 | 6/2006 | Na et al. |
| 2006/0128410 A1* | 6/2006 | Derryberry et al. .......... 455/509 |
| 2006/0128412 A1 | 6/2006 | Mantha et al. |
| 2006/0133346 A1 | 6/2006 | Chheda et al. |
| 2006/0135193 A1 | 6/2006 | Ratasuk et al. |
| 2006/0140154 A1 | 6/2006 | Kwak et al. |
| 2006/0142032 A1 | 6/2006 | Derakhshan et al. |
| 2006/0164981 A1 | 7/2006 | Olsson et al. |
| 2006/0165029 A1 | 7/2006 | Melpignano et al. |
| 2006/0176807 A1 | 8/2006 | Wu et al. |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0246916 A1 | 11/2006 | Cheng et al. |
| 2006/0270399 A1 | 11/2006 | Qi et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0002806 A1 | 1/2007 | Soomro et al. |
| 2007/0004437 A1 | 1/2007 | Harada et al. |
| 2007/0010226 A1 | 1/2007 | Laroia et al. |
| 2007/0015541 A1 | 1/2007 | Dominique et al. |
| 2007/0026803 A1 | 2/2007 | Malm |
| 2007/0026808 A1 | 2/2007 | Love et al. |
| 2007/0026810 A1 | 2/2007 | Love et al. |
| 2007/0030828 A1 | 2/2007 | Vimpari et al. |
| 2007/0036116 A1 | 2/2007 | Eiger et al. |
| 2007/0054624 A1 | 3/2007 | Kashiwagi |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081492 A1 | 4/2007 | Petrovic et al. |
| 2007/0081498 A1 | 4/2007 | Niwano |
| 2007/0104128 A1 | 5/2007 | Laroia et al. |
| 2007/0104164 A1 | 5/2007 | Laroia et al. |
| 2007/0109999 A1 | 5/2007 | Brunner |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng et al. |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das et al. |
| 2007/0149194 A1 | 6/2007 | Das et al. |
| 2007/0149227 A1 | 6/2007 | Parizhsky et al. |
| 2007/0149228 A1 | 6/2007 | Das |
| 2007/0149238 A1 | 6/2007 | Das et al. |
| 2007/0159969 A1 | 7/2007 | Das et al. |
| 2007/0168326 A1 | 7/2007 | Das et al. |
| 2007/0183308 A1 | 8/2007 | Korobokov et al. |
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253357 A1 | 11/2007 | Das et al. |
| 2007/0253358 A1 | 11/2007 | Das et al. |
| 2007/0253385 A1 | 11/2007 | Li et al. |
| 2007/0253449 A1 | 11/2007 | Das et al. |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2009/0004983 A1 | 1/2009 | Darabi |
| 2009/0034455 A1 | 2/2009 | Lee et al. |
| 2009/0103507 A1 | 4/2009 | Gu et al. |
| 2009/0303900 A1 | 12/2009 | Cho et al. |
| 2010/0220626 A1 | 9/2010 | Das et al. |
| 2011/0090812 A1 | 4/2011 | Aoyama |
| 2011/0149789 A1 | 6/2011 | Edge |
| 2012/0140756 A1 | 6/2012 | Rudolf et al. |
| 2013/0230027 A1 | 9/2013 | Das et al. |
| 2013/0242888 A1 | 9/2013 | Das et al. |
| 2015/0043374 A1 | 2/2015 | Hande et al. |

FOREIGN PATENT DOCUMENTS

| | | |
|---|---|---|
| CL | 3605-2006 | 12/2006 |
| CN | 1159262 A | 9/1997 |
| CN | 1159286 A | 9/1997 |
| CN | 1265792 | 9/2000 |
| CN | 1286006 A | 2/2001 |
| CN | 1286821 A | 3/2001 |
| CN | 1286832 A | 3/2001 |
| CN | 1316140 | 10/2001 |
| CN | 1335036 A | 2/2002 |
| CN | 1338877 A | 3/2002 |
| CN | 1507708 | 6/2004 |
| CN | 1604685 | 4/2005 |
| DE | 10162564 | 7/2003 |
| EP | 1037419 A2 | 9/2000 |
| EP | 1037491 | 9/2000 |
| EP | 1 054 518 | 11/2000 |
| EP | 1089500 A2 | 4/2001 |
| EP | 1179962 A2 | 2/2002 |
| EP | 1180881 | 2/2002 |
| EP | 1180907 | 2/2002 |
| EP | 1221273 A1 | 7/2002 |
| EP | 1233637 A1 | 8/2002 |
| EP | 1377100 A2 | 1/2004 |
| EP | 1493284 A1 | 1/2005 |
| EP | 1511245 | 3/2005 |
| EP | 1564953 A2 | 8/2005 |
| EP | 1571762 A1 | 9/2005 |
| EP | 1 594 260 | 11/2005 |
| EP | 1758276 A1 | 2/2007 |
| EP | 1841259 | 10/2007 |
| GB | 2340693 A | 2/2000 |
| JP | 08008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 2003500911 | 6/1998 |
| JP | 11122167 A | 4/1999 |
| JP | 2000049689 A | 2/2000 |
| JP | 2001007761 A | 1/2001 |
| JP | 2001016152 | 1/2001 |
| JP | 2001510974 | 8/2001 |

(56) References Cited

FOREIGN PATENT DOCUMENTS

| | | |
|---|---|---|
| JP | 2001512921 T | 8/2001 |
| JP | 2001251680 A | 9/2001 |
| JP | 2001523901 T | 11/2001 |
| JP | 2001525135 | 12/2001 |
| JP | 2002077992 | 3/2002 |
| JP | 2002111627 A | 4/2002 |
| JP | 2002262330 | 9/2002 |
| JP | 2003018641 A | 1/2003 |
| JP | 2003509983 A | 3/2003 |
| JP | 2003510887 T | 3/2003 |
| JP | 2003520153 A | 7/2003 |
| JP | 2003244161 | 8/2003 |
| JP | 2004153585 | 5/2004 |
| JP | 2004297284 A | 10/2004 |
| JP | 2004533731 | 11/2004 |
| JP | 2004350052 | 12/2004 |
| JP | 2005073276 | 3/2005 |
| JP | 2005130482 | 5/2005 |
| JP | 2005136773 A | 5/2005 |
| JP | 2005142965 A | 6/2005 |
| JP | 2005525730 A | 8/2005 |
| JP | 2005526417 A | 9/2005 |
| JP | 20050099633 | 10/2005 |
| JP | 2005333671 | 12/2005 |
| JP | 2006514735 A | 5/2006 |
| JP | 2006518578 | 8/2006 |
| JP | 06268574 A | 10/2006 |
| JP | 2006524966 T | 11/2006 |
| JP | 2006526323 A | 11/2006 |
| JP | 2007503156 A | 2/2007 |
| JP | 2007509531 | 4/2007 |
| JP | 2007514364 A | 5/2007 |
| JP | 2007514378 T | 5/2007 |
| JP | 2007521685 A | 8/2007 |
| JP | 2007522692 | 8/2007 |
| JP | 2007525044 | 8/2007 |
| JP | 2007525045 T | 8/2007 |
| JP | 2011045054 | 3/2011 |
| KR | 1019990084525 | 12/1999 |
| KR | 20010014223 | 2/2001 |
| KR | 20040018526 | 3/2004 |
| KR | 20040053859 A | 6/2004 |
| KR | 20040084599 A | 10/2004 |
| KR | 20040110044 A | 12/2004 |
| KR | 20050021083 | 3/2005 |
| KR | 20050023187 A | 3/2005 |
| KR | 20050039376 A | 4/2005 |
| KR | 1020050121274 | 12/2005 |
| KR | 20060012282 A | 2/2006 |
| RU | 2149518 C1 | 5/2000 |
| RU | 2181529 | 4/2002 |
| RU | 2188506 C2 | 8/2002 |
| RU | 2202154 C2 | 4/2003 |
| TW | 200423642 | 11/2004 |
| TW | 200539627 | 12/2005 |
| WO | 9408432 | 4/1994 |
| WO | WO9623371 A1 | 8/1996 |
| WO | WO9845967 A2 | 10/1998 |
| WO | WO9856120 A2 | 12/1998 |
| WO | 9907090 A1 | 2/1999 |
| WO | 9909779 A1 | 2/1999 |
| WO | WO9913600 A1 | 3/1999 |
| WO | WO9959254 A2 | 11/1999 |
| WO | WO0101610 A1 | 1/2001 |
| WO | 0122759 A1 | 3/2001 |
| WO | WO0135548 A1 | 5/2001 |
| WO | 0142047 A2 | 6/2001 |
| WO | WO0182504 | 11/2001 |
| WO | 0199291 A2 | 12/2001 |
| WO | WO0232183 A1 | 4/2002 |
| WO | WO0233841 A1 | 4/2002 |
| WO | WO0239760 | 5/2002 |
| WO | WO0249305 | 6/2002 |
| WO | WO02073831 A1 | 9/2002 |
| WO | WO02101941 | 12/2002 |
| WO | WO02104058 A1 | 12/2002 |
| WO | WO03094544 A1 | 11/2003 |
| WO | WO03105498 A1 | 12/2003 |
| WO | 2004031918 A2 | 4/2004 |
| WO | 2004077685 | 9/2004 |
| WO | 2004084503 | 9/2004 |
| WO | WO2004084452 | 9/2004 |
| WO | 2004100450 | 11/2004 |
| WO | 2004110081 | 12/2004 |
| WO | WO2004105420 | 12/2004 |
| WO | 2005018115 A1 | 2/2005 |
| WO | 2005020490 | 3/2005 |
| WO | WO2005034438 | 4/2005 |
| WO | 2005060132 | 6/2005 |
| WO | WO2005057812 A1 | 6/2005 |
| WO | WO2005060132 A1 | 6/2005 |
| WO | WO2005060271 A1 | 6/2005 |
| WO | WO2005060277 A2 | 6/2005 |
| WO | 05065056 | 7/2005 |
| WO | WO2005065056 A2 | 7/2005 |
| WO | WO2005069519 | 7/2005 |
| WO | WO2005125049 A1 | 12/2005 |
| WO | WO2006044718 A2 | 4/2006 |
| WO | 2006075293 | 7/2006 |
| WO | 2007031956 | 3/2007 |

OTHER PUBLICATIONS

Wada, "Study of an OFDM Cellular System Using a Single Band," 2002 Communication Society Convention, Collection of Lecture Papers 1, Japan, IEEE, Aug. 20, 2002, p. 355, B-5-58.
Written Opinion—PCT/US06/048604, International Search Authority—European Patent Office, Mar. 27, 2008.
IEEE P802.16e/D5: "Draft IEEE Standard for Local and metropolitan area networks. Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.
Hang Zhang et al, "Clean up for Closed-Loop MIMO in H-ARQ MAP IE", IEEE P802.16e/D7 Broadband Wireless Access Working Group <http://ieee802.org/16>, pp. 1-6, Mar. 10, 2010.
Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-20, 2004, pp. 654-658.
Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.
Majmundar, "Impact of Mobile-Originated Short Message Service on the Digital Control Channel of TDMA Systems," Vehicular Technology Conference, 2000, IEEE VTS Fall VTC 2000. 52nd Sep. 24-28, 2000, Piscataway, NJ, USA, IEEE, Sep. 24, 2000, pp. 1550-1555.
International Search Report—PCT/US06/048604, International Search Authority—European Patent Office, Mar. 27, 2008.
Taiwanese Search report—095137980—TIPO—Oct. 13, 2010.
3GPP, Radio Resource Control (RRC) protocol specification (3GPP TS 25.331 version 6.3.0 Release 6), ETSI TS 125 331, ETSI, Sep. 2004, V6.3.0 (Sep. 2004), p. 49, 202-209, 220, 221, 406, 579-585, 589, 930.
Ericsson, Discussion on SIR Measurement, TSG-RAN Working Group 4 (Radio) meeting #18, 3GPP, Jul. 9, 2001, R4-010895, URL, http://www.3gpp.org/ftp/tsg_ran/WG4_Radio/TSGR4_18/Docs/R4-010895.zip.
Supplementary European Search Report—EP04713438, Search Authority—The Hague Patent Office, Nov. 30, 2010.
TIM/TILAB, BIU, Mobilkom Austria, One2one, Telefonica, Re-introduction of SIR measurement, 3GPP TSG-RAN4 Meeting

(56) References Cited

OTHER PUBLICATIONS

17,3GPP, May 21, 2001, R4-010647, URL, http://www.3gpp.org/ftp/tsg_ran/WG4_Radio/TSGR4_17/Docs/R4-010647.Zip.

Translation of Office Action in Chinese application 200680047991.2 corresponding to U.S. Appl. No. 11/608,785, citing CN1604685 dated Dec. 31, 2010.

Translation of Office Action in Japan application 2008-547460 corresponding to U.S. Appl. No. 11/333,771, citing WO2005125049 and JP2001007761 dated Mar. 15, 2011.

Translation of Office Action in Japan application 2010-275603 corresponding to U.S. Appl. No. 11/251,069, citing JP2003018641A, 3GPP_ETSI_TS_125_331_year_2004, TIM/TILAB_R4-010647_year_2001 and Ericsson_R4_010895_year_2001 dated Feb. 8, 2011.

Translation of Office Action in Japanese application 2008-535738 corresponding to U.S. Appl. No. 11/486,714, citing JP2007514378, JP2003510887 and WO9623371 dated Nov. 16, 2010.

Translation of Office Action in Japanese application 2008-535789 corresponding to U.S. Appl. No. 11/549,611, citing JP2003244161, JP200277992 and JP2001016152 dated Jan. 18, 2011.

Translation of Office Action in Ukraine application 200508984 corresponding to U.S. Appl. No. 11/748,433, citing US20020160802, WO0232183, RU2181529, WO9845967, EP1377100, US5867478, US20010007552, US6035000 and US5933421 dated Dec. 9, 2010.

Translation of Office Action in Ukraine Application 201010406 corresponding to U.S. Appl. No. 11/748,433, citing US5867478, US20010007552, US6035000, US5933421, WO02073831, WO02032183, RU2181529 and EP1377100 dated Feb. 22, 2011.

3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.

3GPP TSG-RAW WG2 meeting #48. "Scheduling Information Contents," R2-051957, London, United Kingdom, Aug. 29, 2005, URL: http://3gpp.org/ftp/tsg_ran/WG2_RL2/TSGR2_48/Docments/R2-095517.zip.

Cheng-Ta Chang, "Downlink Transmit Power Issues in a WCDMA Cellular System," Dec. 14, 2004 http://wintech.ee.nctu.edu.tw/handoff/MediaTek/Material/intech/1214/Downlink%20Transmit%20Power%20Issues%20in%20a%20WCDMA%20Cellular%20System.pdf p. 3, Fig. 1.

European Search Report—EP11165270, Search Authority—Berlin Patent Office, Jun. 6, 2011.

Gunnarsson, G. et al., "Location Trial System for Mobile Phones," Global Telecommunications Conference, 1998. GLOBECOM 98. The Bridge to Global Integration. IEEE, vol. 4, pp. 2211-2216, Nov. 8-12, 1998.

Hobfeld, T. et al., "Supporting Vertical Handover by Using a Pastry Peer-to-Peer Overlay Network," Fourth Annual IEEE International Conference on Pervasive Computing and Communications Workshops, 2006. Percom Workshops 2006. Mar. 13-17, 2006, pp. 163-167, p. 164, paragraph III, IEEE, Piscataway, NJ, USA, XP010910514, ISBN: 0-7695-2520-2.

Sumsung, Uplink control signaling structure (Revision of R1-041086), 3GPP TSG-RAN WG1 Meeting #38bis, 3GPP, Sep. 20, 2004, R1-041222, URL: http://www.3gpp.org/ftp/tsg_ran/WG1_RL1/TSGR1_38bis/Dcs/R1-041222.zip.

Taiwan Search Report—TW095137938—TIPO—Jul. 21, 2011.

Taiwan Search Report—TW096138348—TIPO—May 24, 2011.

LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.

Taiwan Search Report—TW095148233—TIPO—Oct. 19, 2012.

Taiwan Search Report—TW095148329—TIPO—Dec. 21, 2014.

* cited by examiner

| Request Dictionary 2 Format of ULRQST3 ||| 
| Bits (MSb:Lsb) | Value | $N^{min}$ |
| --- | --- | --- |
| 0b000 | Buffers are empty | 0 |
| 0b001 | ceil(N/y) = 1 | 0 |
| 0b010 | ceil(N/y) = 2:3 | 0 |
| 0b011 | ceil(N/y) = 4:5 | 0 |
| 0b100 | ceil(N/z) = 2 | z + 1 |
| 0b101 | ceil(N/z) = 3 | 2z + 1 |
| 0b110 | ceil(N/z) = 4 | 3z + 1 |
| 0b111 | ceil(N/z) = 5+ | 4z + 1 |

FIGURE 16

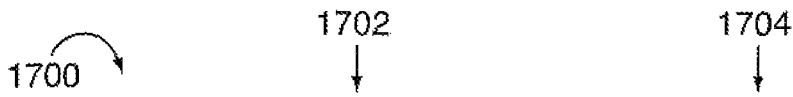

| Request Dictionary 2 Format of ULRQST4 ||
| Bits (MSb:Lsb) | Value |
| --- | --- |
| 0b0000 | Buffers are empty |
| 0b0001 | N = 1+, D <= 10 |
| 0b0010 | N = 1+, D <= 25 |
| 0b0011 | N = 1+, D <= 50 |
| 0b0100 | N = 1+, D <= 75 |
| 0b0101 | N = 1+, D <= $T^{max}$ |
| 0b0110 | Δ = 0 |
| 0b0111 | Δ = 1 |
| 0b1000 | Δ = 2 |
| 0b1001 | Δ = 3 |
| 0b1010 | Δ = 4:5 |
| 0b1011 | ceil(N/z) = 6 |
| 0b1100 | ceil(N/z) = 7 |
| 0b1101 | ceil(N/z) = 8:9 |
| 0b1110 | ceil(N/z) = 10:11 |
| 0b1111 | ceil(N/z) = 12+ |

| Request Dictionary 3 Format of ULRQST4 | | | |
|---|---|---|---|
| Bits (MSb:LSb) | Value | $N_T^{min}$ | g |
| 0b0000 | $N_T = 0$ | 0 | 1 |
| 0b0001 | ceil($N_D$/y) = 1:3 | 0 | 1 |
| 0b0010 | ceil($N_D$/y) = 4+ | 0 | 1 |
| 0b0011 | ceil($N_T$/y) = 1 | 0 | 1 |
| 0b0100 | ceil($N_T$/y) = 2 | 0 | 1 |
| 0b0101 | ceil($N_T$/y) = 3 | 0 | 1 |
| 0b0110 | ceil($N_T$/y) = 4:5 | 0 | 1 |
| 0b0111 | ceil($N_T$/z) = 2 | z + 1 | 1 |
| 0b1000 | ceil($N_T$/z) = 3 | 2z + 1 | 1 |
| 0b1001 | ceil($N_T$/z) = 4 | 3z + 1 | 1 |
| 0b1010 | ceil($N_T$/z) = 5 | 4z + 1 | 1 |
| 0b1011 | ceil($N_T$/y) = 6 | 5z + 1 | 1 |
| 0b1100 | ceil($N_T$/y) = 7 | 6z + 1 | 1 |
| 0b1101 | ceil($N_T$/y) = 8:9 | 7z + 1 | 2 |
| 0b1110 | ceil($N_T$/z) = 10:11 | 9z + 1 | 2 |
| 0b1111 | ceil($N_T$/z) = 12+ | 11z + 1 | 2 |

| Request Dictionary 3 Format of ULRQST3 | |
|---|---|
| Bits (MSb:LSb) | Value |
| 0b000 | [$N_D = 0, \Delta = 0$] |
| 0b001 | [$N_D = 0, \Delta = 1$] |
| 0b010 | [$N_D = 0, \Delta = 2:3$] |
| 0b011 | [$N_D = 0, \Delta = 4+$] |
| 0b100 | [$N_D = 1+, \Delta = 0$] |
| 0b101 | [$N_D = 1+, \Delta = 1$] |
| 0b110 | [$N_D = 1+, \Delta = 2:3$] |
| 0b111 | [$N_D = 1+, \Delta = 4+$] |

FIGURE 20

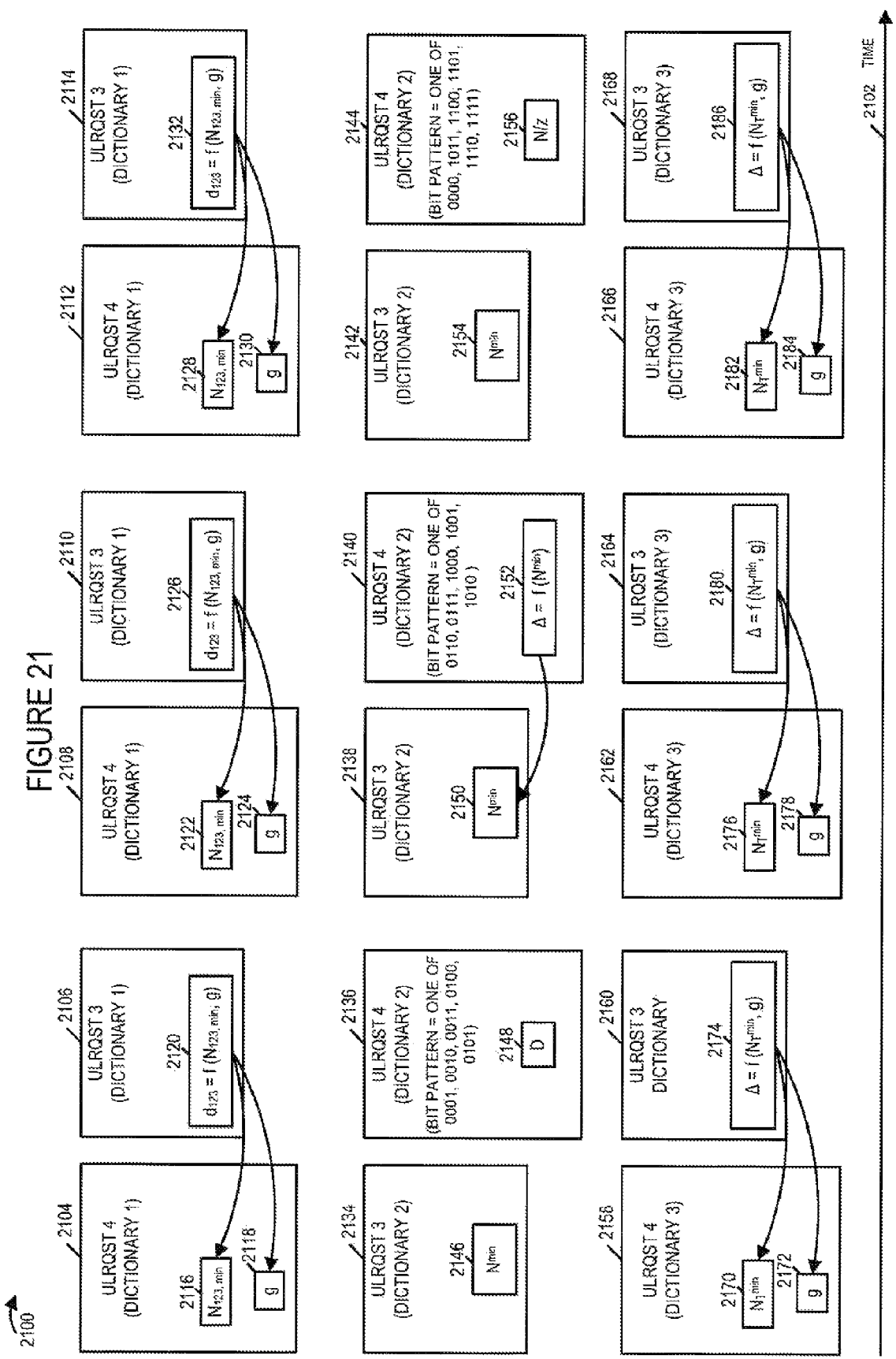

METHODS AND APPARATUS FOR COMMUNICATING BACKLOG RELATED INFORMATION

CLAIM OF PRIORITY UNDER 35 U.S.C. §120

The present application for Patent is a Continuation-in-Part of patent application Ser. No. 11/333,792, filed on Jan. 17, 2006, titled "METHODS AND APPARATUS OF IMPLEMENTING AND/OR USING A DEDICATED CONTROL CHANNEL", pending, which claims priority to Provisional Application No. 60/752,973, filed on Dec. 22, 2005, titled "COMMUNICATIONS METHODS AND APPARATUS", and assigned to the assignee hereof and each of which is hereby expressly incorporated by reference.

FIELD OF THE INVENTION

The present invention relates to wireless communications methods and apparatus and, more particularly, to methods and apparatus related to communicating backlog related information.

BACKGROUND

Wireless terminals in a wireless communications system supporting uplink traffic, e.g., uplink user data, from the wireless terminals to the base stations need to use uplink air link resources to both communicate control information and user data. In multiple access wireless communications systems, typically, multiple wireless terminals using a base station attachment point are competing for valuable uplink air link resources, e.g., uplink traffic channel air link resources. One approach to partitioning uplink traffic channel resources is for the wireless terminals to send resource requests to their current base station attachment point, and for the base station to consider the competing requests and allocate the resources, e.g., uplink traffic channel segments, in accordance with its scheduling rules.

In one approach of request reporting, a wireless terminal reports its absolute backlog during each subsequent request reporting opportunity. This approach although simple to implement is not highly efficient. A wireless terminal, from one request opportunity to another, may not have significantly changed with respect to the amount of uplink traffic backlog that it has queued waiting to be transmitted. For example, the base station may have decided not to allocate the wireless terminal any uplink resources for traffic between the requests due to other wireless terminals needs having higher priority. As another example, the base station may have allocated the wireless only a small fraction of the total amount of resources required to empty its transmission queue backlog.

It should be appreciated that an efficient request reporting implementation reduces the overhead signaling thus leaving move air link resources available for uplink traffic. Based on the above discussion, it should be appreciated that there is a need for methods and apparatus for reporting control information in an efficient manner. It would be desirable if at least some efficient reporting methods could be devised which utilize previously communicated backlog information in at least some reports.

SUMMARY

Various embodiments are directed to methods and apparatus for communicating backlog information, e.g., backlog information indicating amounts of uplink traffic waiting to transmitted by a wireless terminal. Delta backlog reports are used in addition to absolute backlog reports, thus reducing control signaling overhead, at least some information communicated in a delta backlog report being referenced with respect to a previously transmitted backlog report. A base station uses received backlog information including received delta reports from wireless terminals in determining scheduling of uplink traffic channel segments. In some embodiments, the absolute backlog reports sues a first fixed size report format, while the delta backlog report using a second fixed size report format, said second size being different from said first fixed size.

In various exemplary embodiments, a method of operating a communications device to communicate transmission backlog information includes: transmitting at a first point in time a first backlog report communicating backlog information about an amount of data waiting to be transmitted; and transmitting at a second point in time a second backlog report communicating additional backlog information, at least some of said additional information being communicated as a differential value computed using a value communicated by said first backlog report. An exemplary communications device, in accordance with various embodiments includes: a backlog monitoring module for maintaining information about the amount of data waiting to be transmitted; and a report generation module for generating backlog reports communicating different types of backlog related information, one of said types of backlog regulated information being differential type information.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

BRIEF DESCRIPTION OF THE FIGURES

FIG. 16 is a drawing of an information to bit pattern mapping table describing format for a 3 bit uplink request report in accordance with a second exemplary request dictionary, information communicated in a 3 bit report generated in accordance with FIG. 16 being available for utilization as a reference in a subsequent 4 bit report generated in accordance with FIG. 17.

FIG. 17 is a drawing of an information to bit pattern mapping table describing format for a 4 bit uplink request report in accordance with a second exemplary request dictionary, a 4 bit report generated in accordance with FIG. 17 supporting the opportunity to communicate delta backlog information with respect to a previously communicated 3 bit uplink request report in accordance with FIG. 16.

FIG. 19 is a drawing of an information to bit pattern mapping table describing format for a 4 bit uplink request report in accordance with a third exemplary request dictionary, information communicated in a 4 bit report generated in accordance with FIG. 19 being available for utilization as a reference in a subsequent 3 bit report generated in accordance with FIG. 20.

FIG. 20 is a drawing of an information to bit pattern mapping table describing format for a 3 bit uplink request report in accordance with a third exemplary request dictionary, a 3 bit report generated in accordance with FIG. 20 communicating delta backlog information with respect to a previously communicated 4 bit uplink request report in accordance with FIG. 19.

FIG. 21 is a drawing illustrating exemplary sequences of multi-bit uplink request reports corresponding to different request dictionaries and illustrating interdependency between reports.

DETAILED DESCRIPTION

Figure 1:
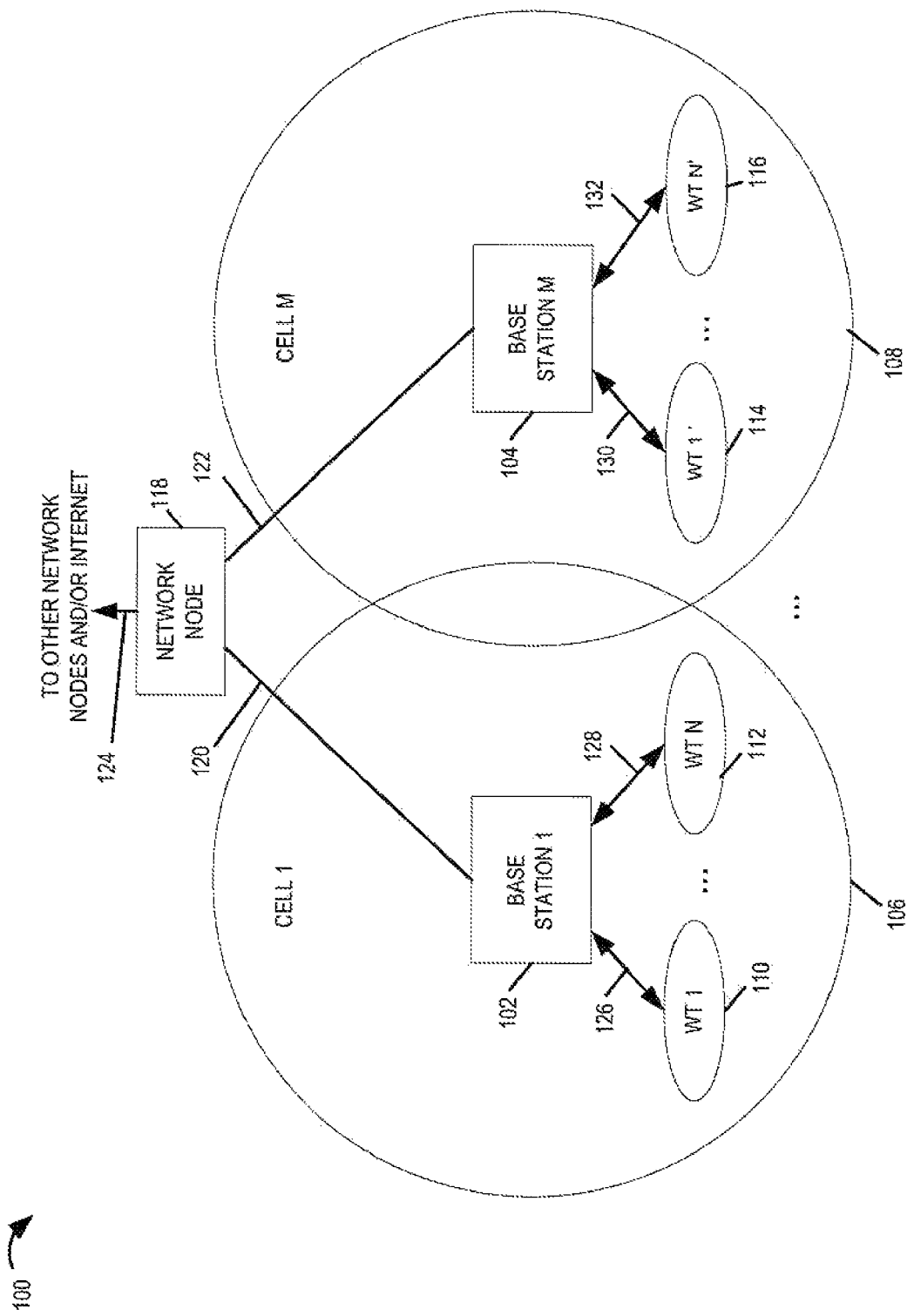
FIG. 1 is a drawing of an exemplary wireless communications system implemented in accordance with various embodiments.

FIG. 1 is drawing of an exemplary wireless communications system 100 implemented in accordance with various embodiments. Exemplary wireless communications system 100 is, e.g., an orthogonal frequency division multiple (OFDM) multiple access wireless communications system.

Exemplary wireless communications system 100 includes a plurality of base stations (base station 1 102, . . . , base station M 104). Each base station (102, 104) has a corresponding wireless coverage area (cell 1 106, cell M 108), respectively. System 100 also includes network node 118 which is coupled to base stations (102, 104) via network links (120, 122), respectively. Network node 118 is also coupled to other network nodes and/or the Internet via link 124. Network links (120, 122, 124) are, e.g., fiber optic links. System 100 may also include cells with multiple sectors and/or cells using multiple carriers.

System 100 also includes a plurality of wireless terminals. At least some of the wireless terminals are mobile nodes which may move throughout the communication system. In FIG. 1, wireless terminals (WT 1 110, WT N 112) are located in cell 1 106 and coupled to base station 1 102 via wireless links (126, 128), respectively. In FIG. 1, wireless terminals (WT 1' 114, WT N' 116) are located in cell M 108 and coupled to base station M 104 via wireless links (130, 132), respectively. In accordance with various embodiments, the wireless terminals communicate transmission backlog information reports, and at least some of the wireless terminals communicate different types of backlog related information, one of said different types of backlog related information being differential type information.

Figure 2:
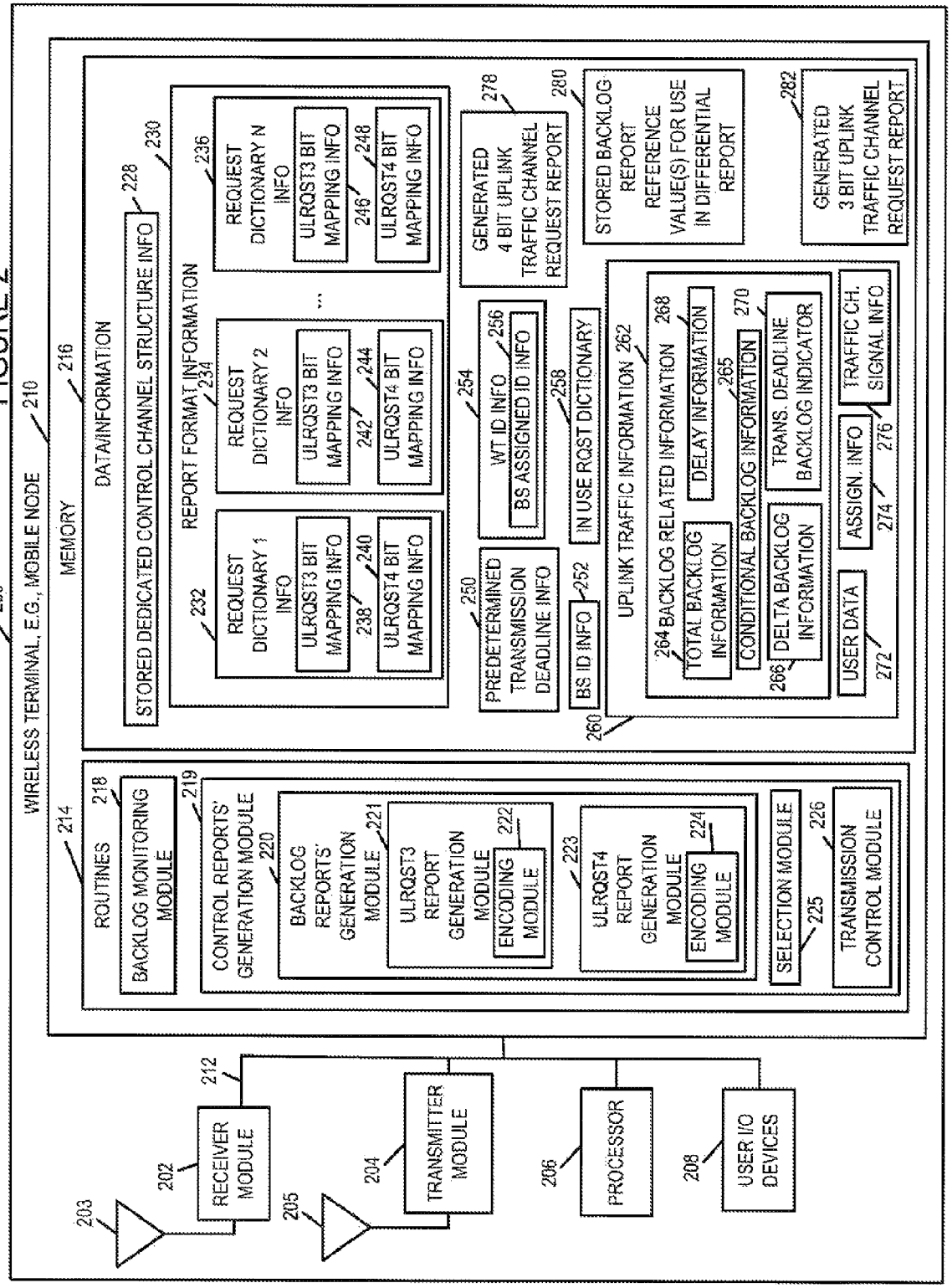
FIG. 2 is a drawing of an exemplary wireless terminal, e.g., mobile node, in accordance with various embodiments.

FIG. 2 is a drawing of an exemplary wireless terminal 200, e.g., mobile node in accordance with various embodiments. Exemplary wireless terminal 200 includes a receiver module 202, a transmitter module 204, a processor 206, user I/O devices 208, a memory 210 coupled together via bus 212 over which the various elements may interchange data and information. Memory 210 includes routines 214 and data/information 216. The processor 206, e.g., a CPU, executes the routines 214 and uses the data/information in memory 210 to control the operation of the wireless terminal 200 and implement methods.

Receiver module 202, e.g., an OFDM receiver, is coupled to receive antenna 203 via which the wireless terminal receives downlink signals from base stations. Downlink signals include, e.g., a base station assigned wireless terminal On state identifier associated with particular slots in a dedicated control channel uplink channel structure. Downlink signals also include assignment signals including assignments of uplink traffic channel segments to the wireless terminal.

Transmitter module 204, e.g., an OFDM transmitter, is coupled to transmit antenna 205, via which the wireless terminal 200 transmits uplink signals to base stations. In some embodiments, the same antenna is used for transmitter and receiver. Uplink signals include dedicated control channel segment signals and traffic channel segment signals. The dedicated control channel segment signals convey a variety of different types of control channel reports including backlog information reports such as 3 and 4 bit uplink traffic channel request reports, interference reports such as beacon ratio reports, and power availability reports such as power backoff reports. At least some of the backlog information reports supported by the wireless terminal 200 include formats to report differential information with respect to information communicated in a previously communicated backlog report.

At different times, the transmitter 204 may, and sometimes does transmit a backlog report communicating a different type of backlog related information. For example, at a first point in time the transmitter transmits a first backlog report communicating backlog information about an amount of data waiting to be transmitted; and at a second point in time the transmitter 204 transmits a second backlog report communicating additional backlog information, at least some of said additional backlog information being communicated as a differential value computer using a value communicated by the first backlog report.

User I/O devices 208 include, e.g., microphone, keyboard, keypad, mouse, camera, switches, speaker, display, etc. User I/O devices 208 allow a user of wireless terminal 200 to input data/information, access output data/information, and control at least some functions of the wireless terminal 200.

Routines 214 include a backlog monitoring module 218, a control reports' generation module 219, a selection module 225, and a transmission control module 226. Control reports' generation module 219 includes a backlog reports' generation module 220, an interference report generation module, an SNR report generation module, a noise report generation module, a power report generation module, and a flexible report generation module.

Backlog monitoring module 218 maintains information about the about of information waiting to be transmitted. Control reports' generation module 219 generates different types of control information reports to be communicated via dedicated control channel uplink segments allocated to the wireless terminal in accordance with the uplink timing and frequency structure information including the stored dedicated control channel structure information 228 and the base station assigned wireless terminal identification information 256. The different types of control information reports include, e.g., backlog information reports, interference reports, power reports, SNR reports, and self-noise reports. Control reports' generation module 219 includes modules corresponding to each type of report including a backlog reports' generation module 220.

Backlog reports' generation module 220 generates backlog reports communicating different types of backlog related information, one of said different types of backlog related information being differential type information. Backlog reports' generation module 220 includes a 1 bit uplink request report generation module, a 3 bit uplink request report (ULRQST3) generation module 221 and a four bit uplink request report (ULRQST4) generation module 223, corresponding to different fixed size backlog reports. ULRQST3 report generation module 221 includes an encoding module 222. ULRQST4 report generation module 223 includes an encoding module 224. 3 bit uplink request report generation module 221 generates 3 bit uplink request reports using backlog information. For a particular generated 3 uplink request report, the 3 bit uplink request report generation module 221 uses the one of: request dictionary 1 ULRQST3 bit mapping information 238, request dictionary 2 ULRQST3 bit mapping information 242, . . . , request dictionary N ULRQST3 bit mapping information 246 corresponding to in-use request dictionary identified by information 258. 4 bit uplink request report generation module 223 generates 4 bit uplink request reports using backlog information. For a particular generated 4 bit uplink request report, the 4 bit uplink request report generation module 223 uses the one of: request dictionary 1 ULRQST4 bit mapping information 240, request dictionary 2 ULRQST4 bit mapping information 244, . . . , request dictionary N ULRQST4 bit mapping information 248 corresponding to in-use request dictionary identified by information 258.

Encoding module 222, encodes as part of the generation, for some ULRQST3 reports for at least some bit patterns, joint information. For example, corresponding to request dictionary 2 total backlog information is jointly encoded with a reference parameter indicative of total backlog (see FIG. 16); corresponding to request dictionary 3 a differential value and an indication of whether or not there is at least one unit of data waiting to be transmitted are jointly coded (see FIG. 20).

Encoding module 224, encodes as part of the generation, for some ULRQST4 reports for at least some bit patterns, joint information. For example, corresponding to request dictionary 2, for five bit patterns, delay information is jointly encoded with an indication that there is at least some backlog (see FIG. 17; corresponding to request dictionary 3 backlog count information is jointly coded with two reference values indicative of backlog (see FIG. 19).

Data/information 216 includes stored dedicated control channel structure information 228, report format information 230 and predetermined transmission deadline information 250. Report format information 230 includes request dictionary 1 information 232, request dictionary 2 information 234 and request dictionary N information 236. Request dictionary 1 information 232 includes 3 bit uplink request report bit mapping information 238 and 4 bit uplink request report format bit mapping information 240. Request dictionary 2 information 234 includes 3 bit uplink request report bit mapping information 242 and 4 bit uplink request report format bit mapping information 244. Request dictionary N information 236 includes 3 bit uplink request report bit mapping information 246 and 4 bit uplink request report format bit mapping information 248.

Figure 7:
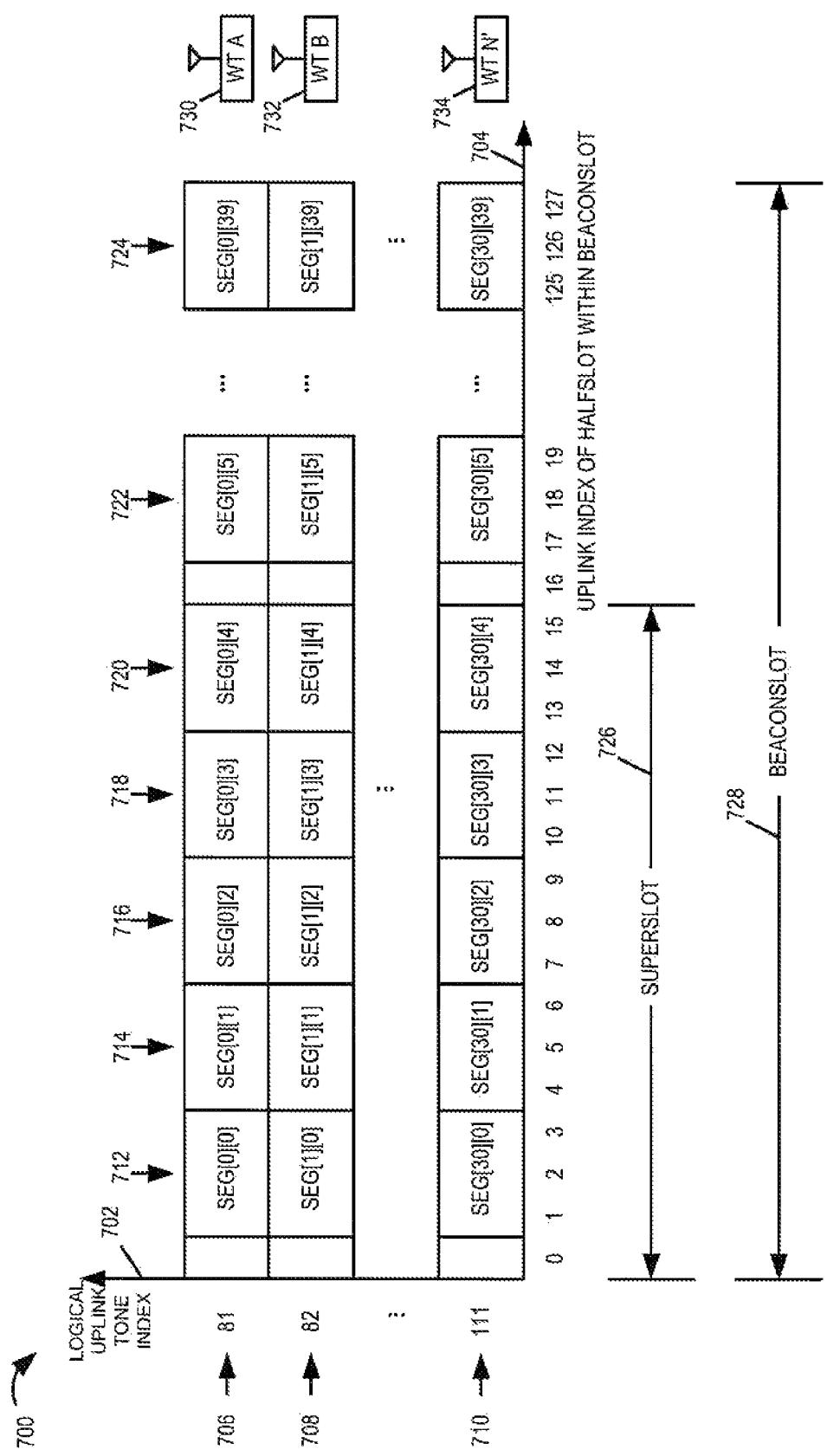
FIG. 7 is a drawing of exemplary uplink dedicated control channel (DCCH) segments in an exemplary uplink timing and frequency structure in an exemplary orthogonal frequency division multiplexing (OFDM) multiple access wireless communications system.
Figure 8:
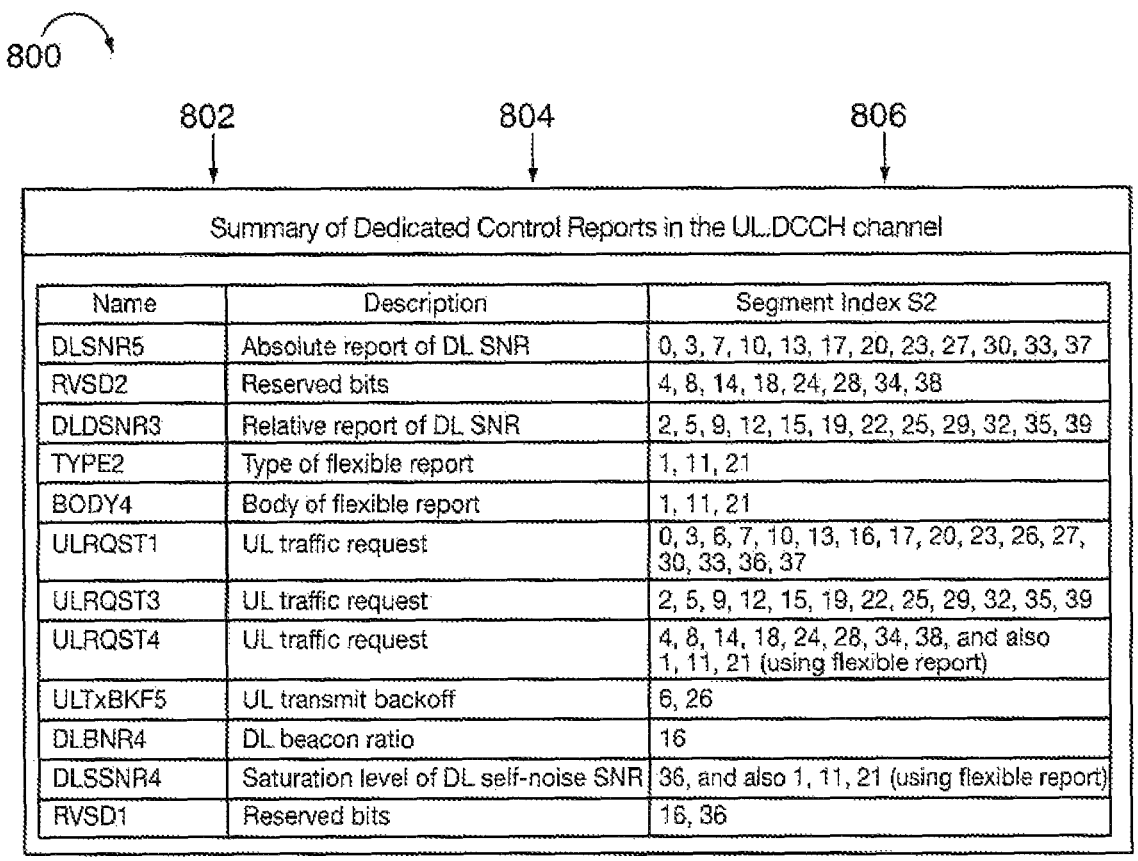
FIG. 8 is a drawing of a table listing exemplary dedicated control reports that may be communicated using the dedicated control channel segments of FIG. 7.
Figure 9:
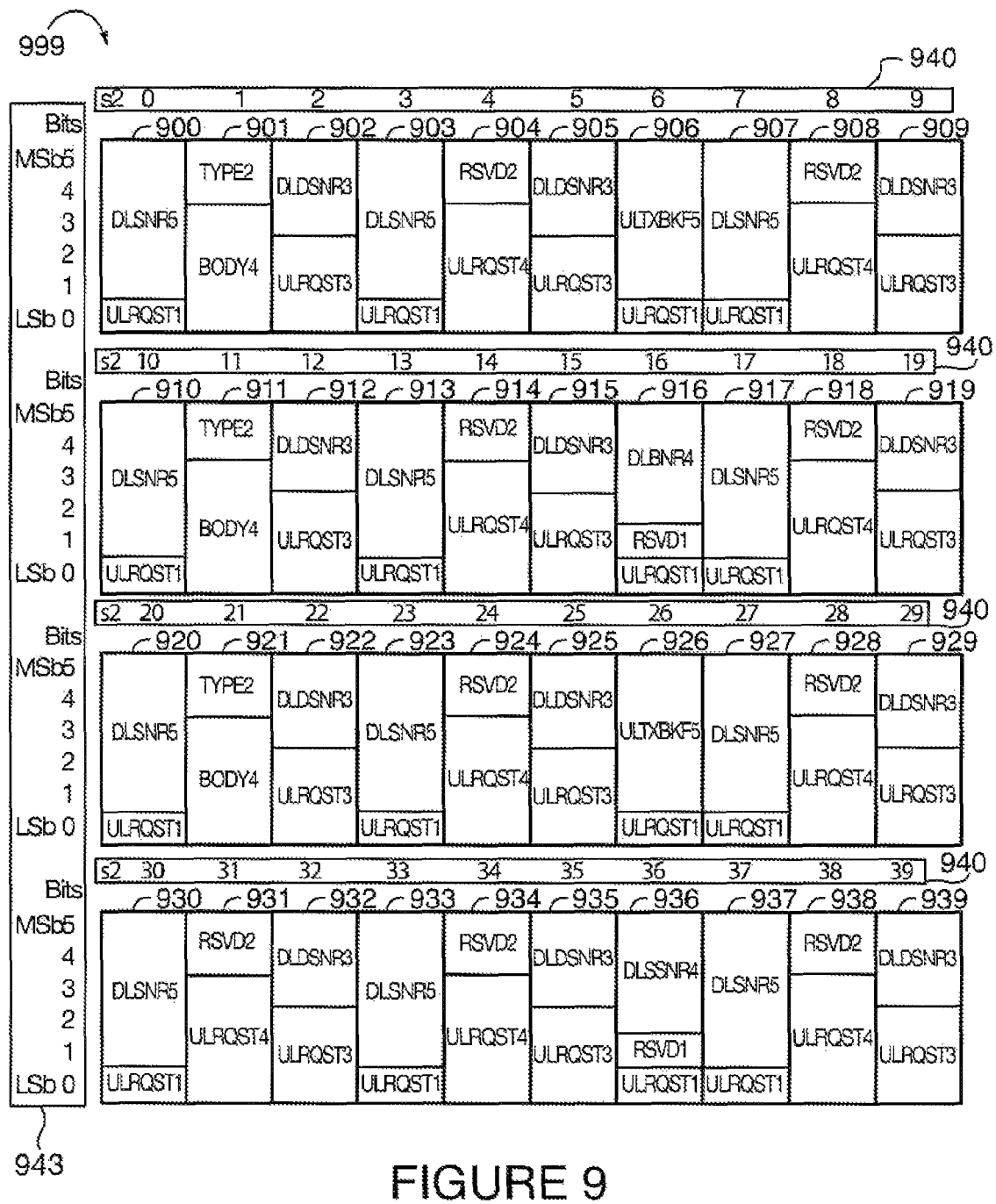
FIG. 9 is a drawing illustrating exemplary reporting format information in an exemplary time interval, e.g., a beaconslot, for a given DCCH tone, e.g., corresponding to a wireless terminal.

Information in FIGS. 7, 8 and 9 includes some exemplary dedicated control channel structure information. Predetermined transmission deadline information 250 includes, e.g., one or more limits, e.g., a value for $T_{max}$ of table 1700 and/or a value for $T_M$ corresponding to frame count inclusion with respect to $N_D$ counts for tables 1900 and 2000.

Figure 12:
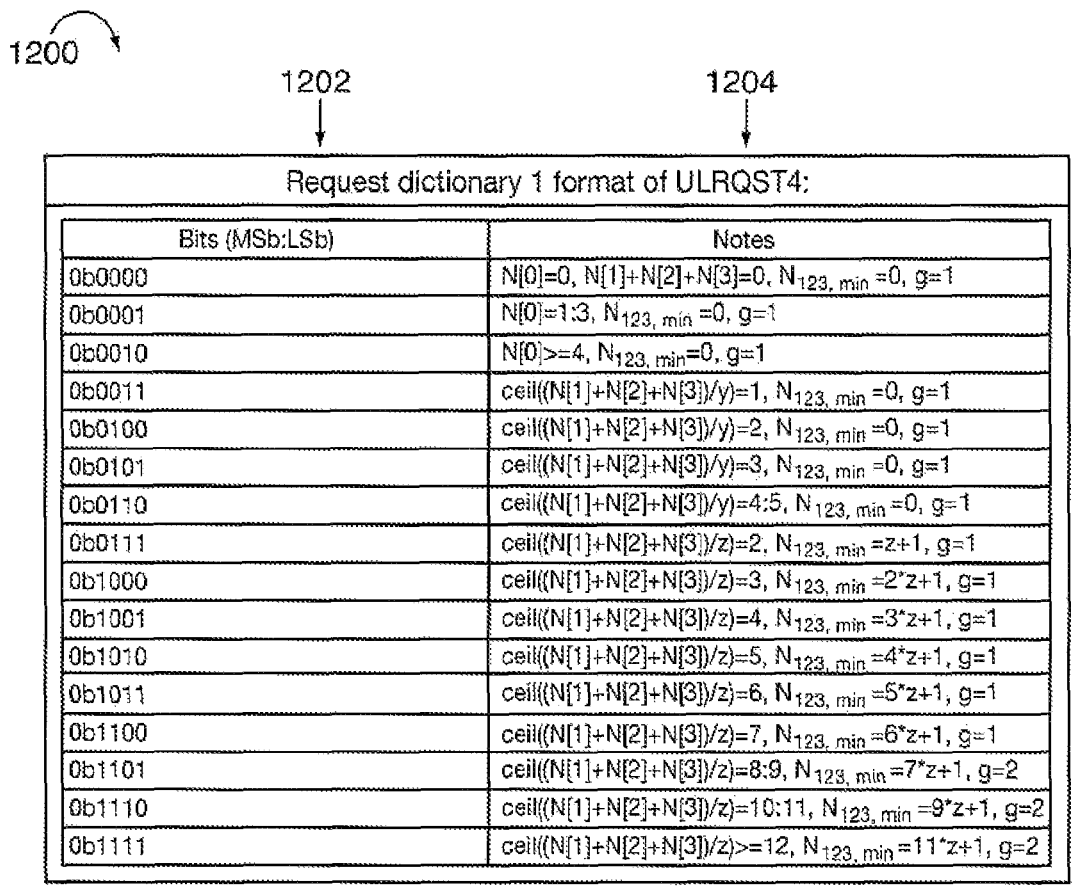
FIG. 12 is a drawing of an information to bit pattern mapping table describing format for a 4 bit uplink request report in accordance with a first exemplary request dictionary, information communicated in a 4 bit report generated in accordance with FIG. 12 being available for utilization as a reference in a subsequent 3 bit report generated in accordance with FIG. 13.
Figure 13:
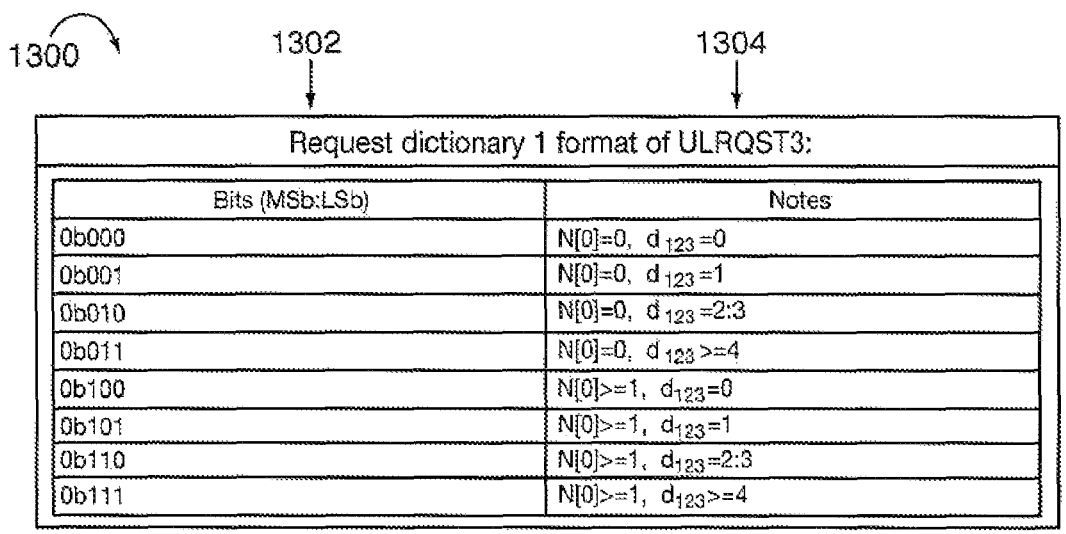
FIG. 13 is a drawing of an information to bit pattern mapping table describing format for a 3 bit uplink request report in accordance with a first exemplary request dictionary, a 3 bit report generated in accordance with FIG. 13 communicating delta backlog information with respect to a previously communicated 4 bit uplink request report in accordance with FIG. 12.

ULRQST3 bit mapping information 238 of request dictionary 1 information 232 includes, e.g., the information of table 1300 of FIG. 13, while ULRQST4 bit mapping information 240 of request dictionary 1 information 232 includes, e.g., the information of table 1200 of FIG. 12. ULRQST3 bit mapping information 242 of request dictionary 2 information 234 includes, e.g., the information of table 1600 of FIG. 16, while ULRQST4 bit mapping information 244 of request dictionary 2 information 234 includes, e.g., the information of table 1700 of FIG. 17. ULRQST3 bit mapping information 246 of request dictionary N information 236 includes, e.g., the information of table 2000 of FIG. 20, while ULRQST4 bit mapping information 248 of request dictionary N information 236 includes, e.g., the information of table 1900 of FIG. 19.

Data/information 216 also includes base station identification information 252, wireless terminal identification information 254, information identifying an in-use request dictionary 258, uplink traffic information 260, a generated 4 bit uplink traffic channel request report 278, stored backlog report reference value(s) for use in a differential report 280, and a generated 3 bit uplink traffic channel request report 282.

Wireless terminal identification information 254 includes base station assigned identification information 256. The base station assigned identification information 256, e.g., identifies one of the 31 different DCCH channels identified in FIG.

7. In use-request dictionary information 258 identifies which one of the N request dictionaries is currently in use by the wireless terminal, and is used by the backlog reports' generation module 220 in selecting the appropriate report format to use in report generation. Stored backlog report reference values 280 are, e.g., stored values corresponding to variables $N_{123, \, min}$, g, $N^{min}$, $N_T^{min}$ (see tables 1200, 1600 and 1900), which can be used as reference values in a subsequent differential type backlog report. Generated 4 bit uplink traffic channel request report, e.g., a 4 bit bit pattern conveying request report information, is an output of ULRQST4 report generation module 223. Generated 3 bit uplink traffic channel request report, e.g., a 3 bit bit pattern conveying request report information, is an output of ULRQST3 report generation module 221.

Uplink traffic information 260 includes backlog related information 262, user data 272, assignment information 274, and traffic channel signal information 276. Backlog related information 262 includes total backlog information 264, conditional backlog information 265, delta backlog information 266, delay information pertaining to backlog 268, and a transmission deadline backlog indicator 270. Total backlog information includes, e.g., total frame counts N, $N_T$ and total frame counts corresponding to request groups and/or transmission streams N[0], N[1], N[1], N[3], etc. Conditional backlog information 265 includes, e.g., delay information constrained backlog counts, e.g., $N_D$. Delay information 268 includes delay information relate to transmission backlog, e.g., the value D communicated in the format of table 1700. Delta backlog information 266 includes, e.g., backlog information values, such as $d_{123}$ or Δ described with respect to table 1300, table 1700 and table 1900. Transmission deadline backlog indicator 270 is, e.g., a flag indicting whether or not there is at least one unit of data waiting to be transmitted with a first transmission deadline.

User data 272 includes, e.g., audio, voice, image, text, and/or file user data waiting to be transmitted, e.g., waiting in transmission queues for assigned uplink traffic channel segments. Assignment information 274 includes decoded assignment signal information identifying which uplink traffic channel segments are to be used by the wireless terminal 200. Traffic channel segment signal information 276 includes information includes in assigned traffic channel segments allocated to WT 200, e.g., coded blocks conveying user data.

Figure 3:
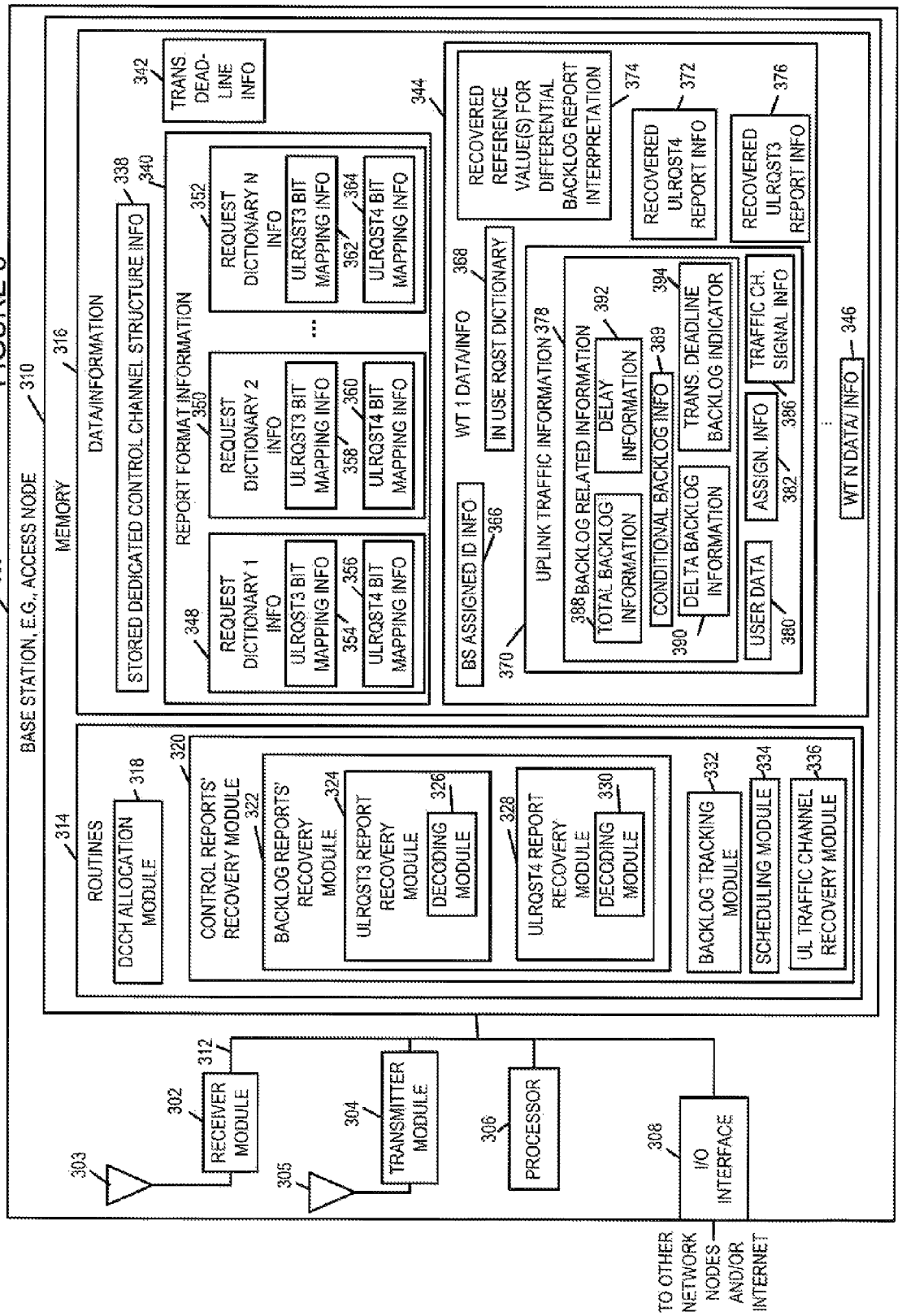
FIG. 3 is a drawing of an exemplary base, station, e.g., access node, in accordance with various embodiments.

FIG. 3 is a drawing of an exemplary base station 300, e.g., access node, implemented in accordance with various embodiments. Exemplary base station 300 may be any of the base station (102, 104) of system 100 of FIG. 1.

Exemplary base station 300 includes a receiver module 302, a transmitter module 304, a processor 306, an I/O interface 308 and memory 310 coupled together via a bus 312 over which the various elements interchange data and information. Memory 310 includes routines 314 and data/information 316. The processor 306, e.g., a CPU, executes the routines 314 and uses the data/information 316 in memory 310 to control the operation of the base station 300 and implement methods.

Receiver module 302, e.g., an OFDM receiver, is coupled to receive antenna 303 via which the base station 300 receives uplink signals from wireless terminals. The uplink signals include access signals, dedicated control channel segment signals, and traffic channel segment signals. The dedicated control channel segment signals convey a plurality of different types of control channel reports including uplink request reports, e.g., conveying backlog information and/or delay information related to queued data waiting to be transmitted. At least some of the uplink request reports convey delta information with respect to a previously transmitted uplink request report.

Transmitter module 304, e.g., an OFDM transmitter, is coupled to transmit antenna 305 via which the base station transmits downlink signals to wireless terminals. Downlink signals include timing/frequency reference signals, e.g., beacon and/or pilot signals, registration signals, assignment signals, and downlink traffic channel signals. The assignment signals include assignments of uplink traffic channel segments, e.g., in response to received uplink request reports based on decisions by scheduling module 334.

I/O interface 308 couples the base station 300 to other network nodes, e.g., other base stations, routers, AAA nodes, Home Agent nodes, etc., and/or the Internet. I/O interface 308, by coupling the base station 300 to a backhaul network, allows a wireless terminal using a base station 300 attachment point to participate in a communications session with a peer node using a different base station as its point of network attachment.

Routines 314 includes a dedicated control channel allocation module 318, a control reports' recovery module 320, a backlog tracking module 332, a scheduling module 334, and uplink traffic channel recovery module 336. Control reports' recovery module 332 includes a 3 bit uplink request report (ULRQST3) recovery module 324 including a decoding module 326 and a 4 bit uplink request report (ULRQST4) recovery module 328 including a decoding module 330.

Dedicated control channel allocation module 318 allocates dedicated control channel segments to wireless terminals to use to communicate uplink control information reports including backlog reports which can and sometimes do include delta type reports, which are based on information in previously communicated reports. DCCH allocation module 318 assigns a wireless terminal, which is to operate in an On state of operation, with base station assigned identification information 366, e.g., a base station assigned wireless terminal identifier associated with particular DCCH segments in a recurring reporting structure as in FIG. 7.

Control reports' recovery module 320 recovers information from dedicated control channel reports communicated by wireless terminals, e.g., uplink request reports of different bit sizes, interference reports, noise reports, power reports, etc. Backlog reports' recovery module 322 recovers information from backlog reports, e.g., ULRQST1 reports, ULRQST3 reports, ULRQST4 reports. ULRQST3 report recovery module 324 recovers 3 bit uplink request report information from received ULRQST3 reports in accordance with the request dictionary in-use by the wireless terminal which transmitted the report and using the corresponding set of format information to decode the report by operations of decoding module 326. ULRQST4 report recovery module 328 recovers 4 bit uplink request report information from received ULRQST4 reports in accordance with the request dictionary in-use by the wireless terminal which transmitted the report and using the corresponding set of format information to decode the report by operations of decoding module 330. For some backlog reports recovering information including processing received delta backlog information referenced with respect to a previously communicated backlog report. Different wireless terminals may be, and sometimes are, using different request dictionaries, simultaneously.

Backlog tracking module 332 maintains backlog information, e.g., statistics such as frame counts of traffic waiting to be communicated via uplink traffic channel segments and delay information parameters, corresponding to wireless terminals using the base station which are competing for uplink traffic channel resources.

Scheduling module 334, e.g., a scheduler, schedules air link resources including uplink traffic channel segments to wireless terminals. Scheduling module 334 uses maintained backlog related information, e.g., frame counts and delay information, in performing scheduling decisions regarding the allocation of uplink traffic channel segments. In some embodiments, the scheduler makes scheduling decisions as a function of total backlog data unit count information, delay constrained backlog data unit count information, and delay information. The base station assigns uplink traffic segments in response to the scheduling decisions and transmits assignment signals to convey the assignments to the wireless terminal Uplink traffic channel recovery module 336 recovers information, e.g., user data, from traffic channel segment signals.

Data/information 316 includes channel timing and frequency structure information including stored dedicated control channel structure information 338. Data/information 316 also includes report format information 340 and transmission deadline information 342.

Information in FIGS. 7, 8 and 9 includes some exemplary dedicated control channel structure information 338. Transmission deadline information 342 includes, e.g., one or more limits, e.g., a value for $T_{max}$ of table 1700 and/or a value for $T_M$ corresponding to frame count inclusion with respect to $N_D$ counts for tables 1900 and 2000.

Report format information 340 includes information defining formats for a plurality of different types of control channel reports including different bit size uplink request reports, interference reports, power reports, SNR reports, noise reports, etc. Reports formats information 340 includes, in this embodiment, uplink request report formats corresponding to a plurality of request dictionaries, at least some of the report formats supporting the communication of delta information with respect to a previously transmitted uplink request report. Report format information 340 includes request dictionary 1 information 348, request dictionary 2 information 350 and request dictionary N information 352. Request dictionary 1 information 348 includes 3 bit uplink request report bit mapping information 354 and 4 bit uplink request report bit mapping information 356. Request dictionary 2 information 350 includes 3 bit uplink request report bit mapping information 358 and 4 bit uplink request report bit mapping information 360. Request dictionary N information 352 includes 3 bit uplink request report bit mapping information 362 and 4 bit uplink request bit mapping information 364.

ULRQST3 bit mapping information 354 of request dictionary 1 information 348 includes, e.g., the information of table 1300 of FIG. 13, while ULRQST4 bit mapping information 356 of request dictionary 1 information 348 includes, e.g., the information of table 1200 of FIG. 12. ULRQST3 bit mapping information 358 of request dictionary 2 information 350 includes, e.g., the information of table 1600 of FIG. 16, while ULRQST4 bit mapping information 360 of request dictionary 2 information 350 includes, e.g., the information of table 1700 of FIG. 17. ULRQST3 bit mapping information 362 of request dictionary N information 352 includes, e.g., the information of table 2000 of FIG. 20, while ULRQST4 bit mapping information 364 of request dictionary n information 352 includes, e.g., the information of table 1900 of FIG. 19.

Data/information 316 also includes a plurality of set of data/information corresponding to wireless terminals using base station 300 as their point of network attachment (WT data/information 344, ..., WT N data/information 346). WT 1 data/information 344 includes base station assigned identification information 366, in-use request dictionary identification information 368, recovered 4 bit uplink request report information 372, recovered 3 bit uplink request report information 376, recovered reference value(s) for differential backlog report interpretation 374, and uplink traffic information 370. Uplink traffic information 370 includes backlog related information 378, user data 380, assignment information 382, and traffic channel signal information 386. Backlog related information 378 includes total backlog information 388, conditional backlog information 389, delta backlog information 390, delay information 392, and a transmission deadline backlog indicator 394.

The base station assigned identification information 366, e.g., identifies one of the 31 different DCCH channels identified in FIG. 7. In use-request dictionary information 368 identifies which one of the N request dictionaries is currently in use by WT1, and is used by the backlog reports' recovery module 322 in selecting the appropriate report format to use in report generation. Recovered reference value(s) for differential backlog report interpretation 374 are, e.g., stored values corresponding to variables $N_{123, min}$, g, $N^{min}$, $N_T^{min}$ (see tables 1200, 1600 and 1900), which can be used as reference values in a subsequently received differential type backlog report. Recovered 4 bit uplink traffic channel request report info 372 is an output of ULRQST4 report recovery module 328. Recovered 3 bit uplink traffic channel request report information 376 is an output of ULRQST3 report recovery module 324.

Backlog related information 378 includes total backlog information 388, conditional backlog information 389, delta backlog information 390, delay information pertaining to backlog 392, and a transmission deadline backlog indicator 394. Total backlog information 388 includes, e.g., total frame counts N, $N_T$ and total frame counts corresponding to request groups and/or transmission streams N[0], N[1], N[2], N[3], etc. Conditional backlog information 389 includes, e.g., delay information constrained backlog counts, e.g., $N_D$. Delay information 392 includes delay information related to transmission backlog, e.g., the value D communicated in the format of table 1700. Delta backlog information 390 includes, e.g., backlog information values, such as $d_{123}$ or $\Delta$ described with respect to table 1300, table 1700 and table 1900. Transmission deadline backlog indicator 394 is, e.g., a flag indicating whether or not there is at least one unit of data waiting to be transmitted with a first transmission deadline.

User data 380 includes, e.g., audio, voice, image, text, and/or file user data recovered from traffic channel signals from WT1 communicated via uplink traffic channel segments assigned to WT1, the recovery performed under the control of UL traffic channel recovery module 336. Traffic channel segment signal information 386 includes information which is an input to recovery module 336. Assignment information 382 includes assignment signal information pertaining to WT1 including assignment information identifying which uplink traffic channel segments are to be used by WT1.

Figure 4:
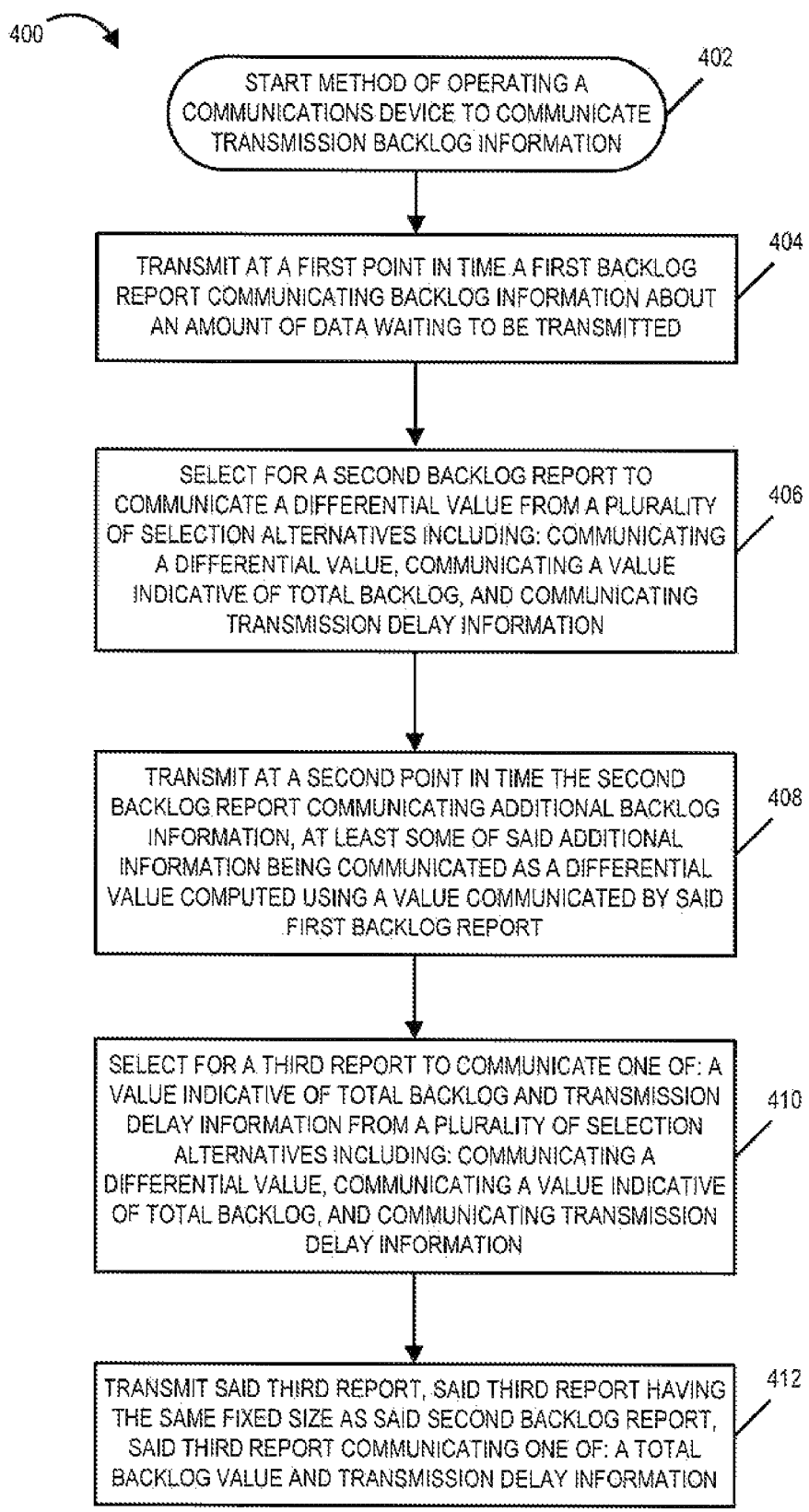
FIG. 4 is a drawing of a flowchart of an exemplary method of operating a communications device, e.g., a wireless terminal such as a mobile node, to communicate transmission backlog information, e.g., to a base station, in accordance with various embodiments.

FIG. 4 is a drawing of a flowchart 400 of an exemplary method of operating a communications device, e.g., a wireless terminal such as a mobile node, to communicate transmission backlog information, e.g., to a base station, in accordance with various embodiments.

Operation of the method starts in step 402, where the communications device is powered on and initialized. Operation proceeds from start step 402 to step 404, where the communications device transmits, at a first point in time, a first backlog report communicating backlog information about an amount of data waiting to be transmitted. Operation proceeds from step 404 to step 406. In step 406, the wireless terminal selects for a second backlog report to communicate a differential value from a plurality of selection alternatives including: communicating a differential value, communicating a value indicative of total backlog, and communicating transmission delay information. Then, in step 408, the communications device transmits, at a second point in time the second backlog report communicating additional backlog information, at least some of said additional information being communicated as a differential value computed using a value communicated by said first backlog report.

Operation proceeds from step 408 to step 410. In step 410, the communications device selects, for a third report, to communicate one of: a value indicative of total backlog and transmission delay information from a plurality of selection alternatives including: communicating a differential value, communicating a value indicative of total backlog, and communicating transmission delay information. Then, in step 412, the communications device transmits said third report, said third report having the same fixed size as said second backlog report, said third report communicating one of: a total backlog value and transmission delay information.

In various embodiments, the first backlog report is a first fixed size report and the second backlog report is a second fixed size report which includes more bits than the first size report. For example, in some embodiments, the fixed size of the first report is 3 information bits and the fixed size of the second report is 4 information bits.

In some embodiments, the first, second and third reports use dedicated time slots in a reporting structure. In various embodiments, the first, second and third reports are uplink traffic channel request reports. In some embodiments, the second and third reports are the same type of report, e.g., a 4 bit uplink request report, and correspond to different ones of the same set of information to bit pattern mappings.

In one example corresponding to FIG. 4, the wireless terminal is using exemplary request dictionary 2 as indicated by table 1600 of FIG. 16 and table 1700 of FIG. 17, the first backlog report is an ULRQST3 report in accordance with FIG. 16, the second and third reports are ULRQST4 reports in accordance with FIG. 17. Continuing with the example, the second backlog report has one of bit patterns 0110, 0111, 1000, 1001 and 1010 conveying differential value Δ; and the third report has one of bit patterns 0000, 0001, 0010, 0011, 0100, 0101, 1011, 1100, 1101, 1110 and 1111 communicating one of a value indicative of total backlog and a delay information. Consider ULRQST4 format of FIG. 17 selection alternatives: (i) bit patterns 0000, 1011, 1100, 1101, 1110 and 1110 convey a value indicative of total backlog; (ii) bit patterns 0110, 0111, 1000 and 1001 convey a differential value; (iii) bit patterns 0001, 0010, 0011 and 0100 and 1001 convey delay information. Consider ULRQST3 format of FIG. 16 which communicates backlog information about data waiting to be transmitted, and the value used of $N^{min}$ is used by the second report to calculate the value of Δ.

Figure 5:
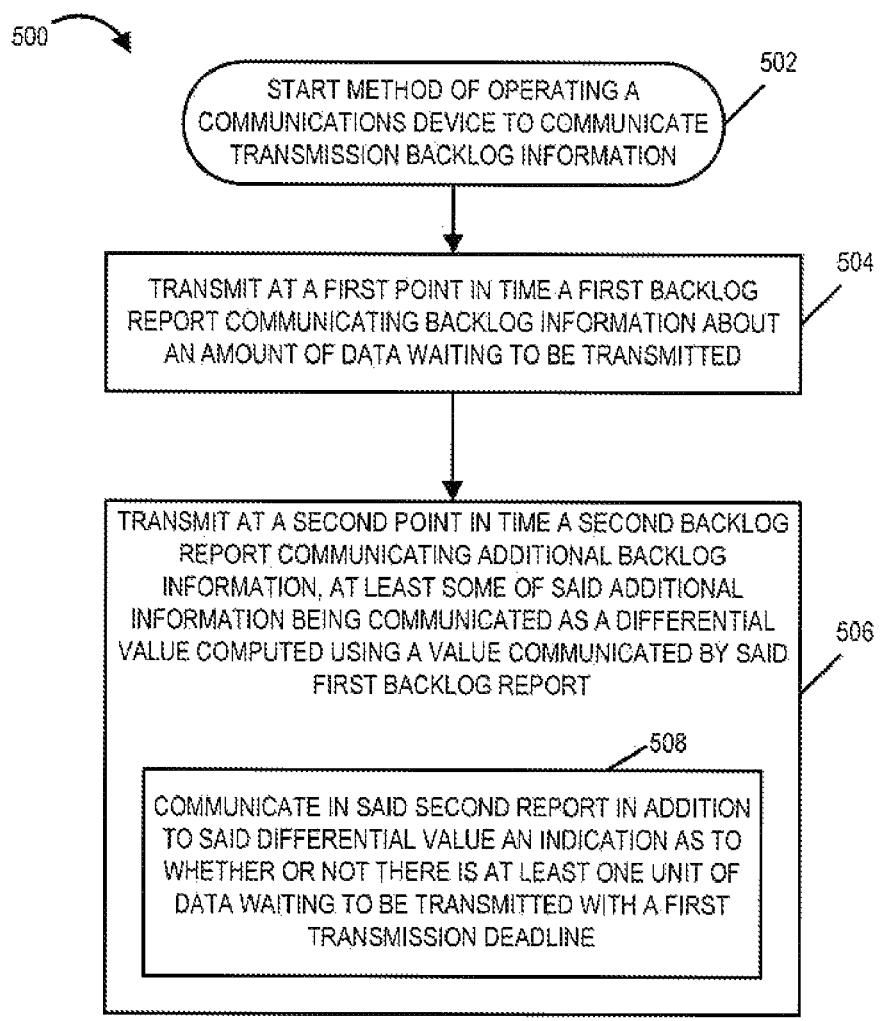
FIG. 5 is a drawing of a flowchart of an exemplary method of operating a communications device, e.g., a wireless terminal such as a mobile node, to communicate transmission backlog information, e.g., to a base station, in accordance with various embodiments.

FIG. 5 is a drawing of a flowchart 500 of an exemplary method of operating a communications device, e.g., a wireless terminal such as a mobile node, to communicate transmission backlog information, e.g., to a base station, in accordance with various embodiments.

Operation of the method starts in step 502, where the communications device is powered on and initialized. Operation proceeds from start step 502 to step 504, where the communications device transmits, at a first point in time, a first backlog report communicating backlog information about an amount of data waiting to be transmitted. Operation proceeds from step 504 to step 506. Then, in step 506, the communications device transmits, at a second point in time a second backlog report communicating additional backlog information, at least some of said additional information being communicated as a differential value computed using a value communicated by said first backlog report.

Step 506 includes sub-step 508, in which the communications device communicates in the second report in addition to said differential value an indication as to whether or not there is at least one unit of data waiting to be transmitted with a first transmission deadline. In some embodiments, the first transmission deadline is a predetermined transmission deadline. The predetermined transmission deadline is, in some embodiments, relative to a communication time corresponding to said second report transmission.

In various embodiments, the first backlog report is a first fixed size report and the second backlog report is a second fixed size report which includes less bits than the first size report. For example, in some embodiments, the fixed size of the first report is 4 information bits and the fixed size of the second report is 3 information bits.

In some embodiments, the first and reports use dedicated time slots in a reporting structure. In various embodiments, the first and second reports are uplink traffic channel request reports.

In one example corresponding to FIG. 5, the wireless terminal is using exemplary request dictionary 3 as indicated by table 1900 of FIG. 19 and table 2000 of FIG. 20, the first backlog report is an ULRQST4 report in accordance with FIG. 19, the second report is an ULRQST3 report in accordance with FIG. 20. Continuing with the example, the differential value of the second report is the Δ value described with respect to table 2000 which is computed as a function of $N_T^{min}$ and g obtained from the first report using the ULRQST4 format of table 1900. The indication, communicated in the second report, as to whether or not there is at least one unit of data waiting to be transmitted with a first transmission deadline is the indication communicated by the second report as to whether or not $N_D=0$.

Figure 6A:
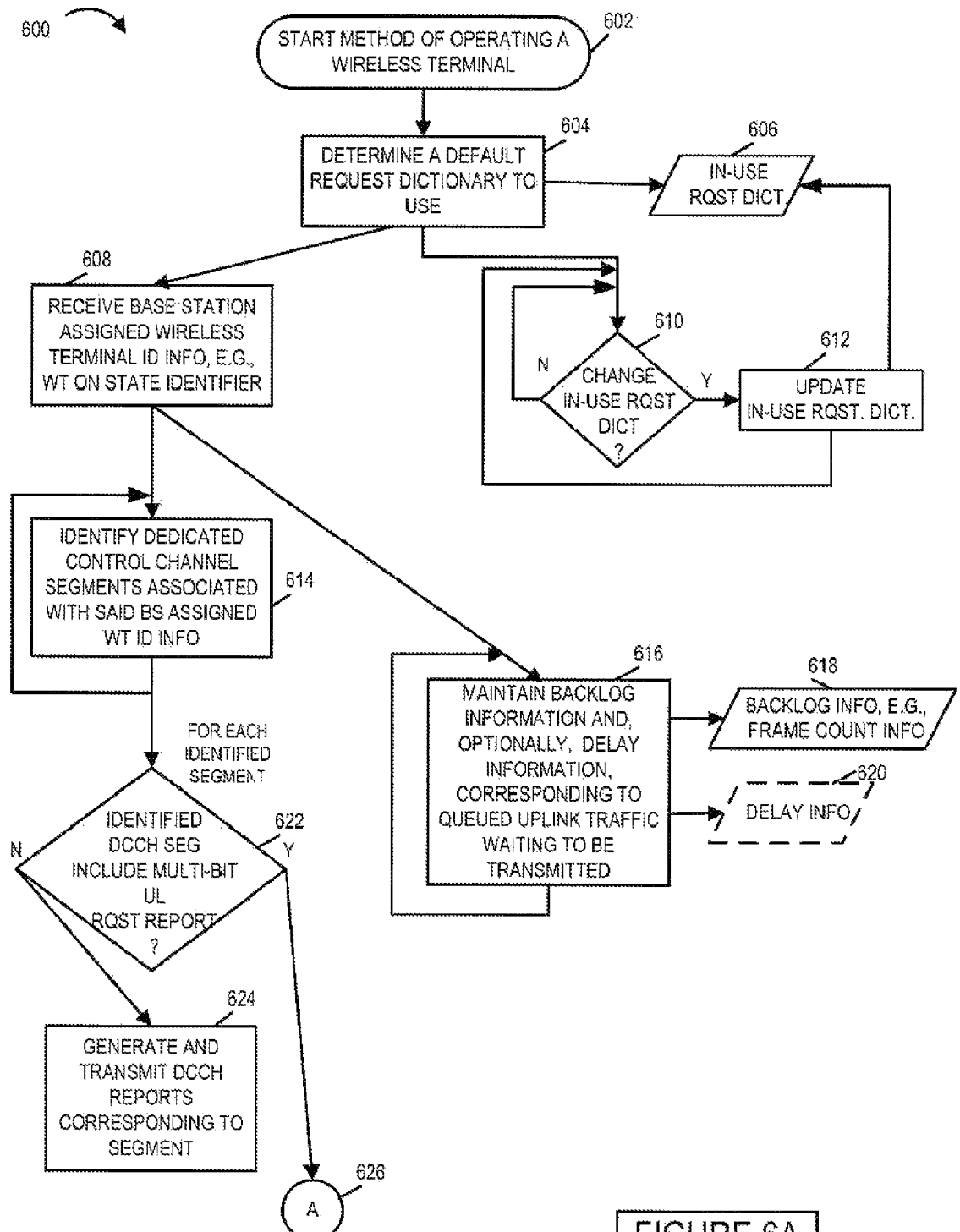
FIG. 6, comprising the combination of FIG. 6A and FIG. 6B, is a drawing of a flowchart of an exemplary method of operating a wireless terminal in accordance with various embodiments.
Figure 6B:
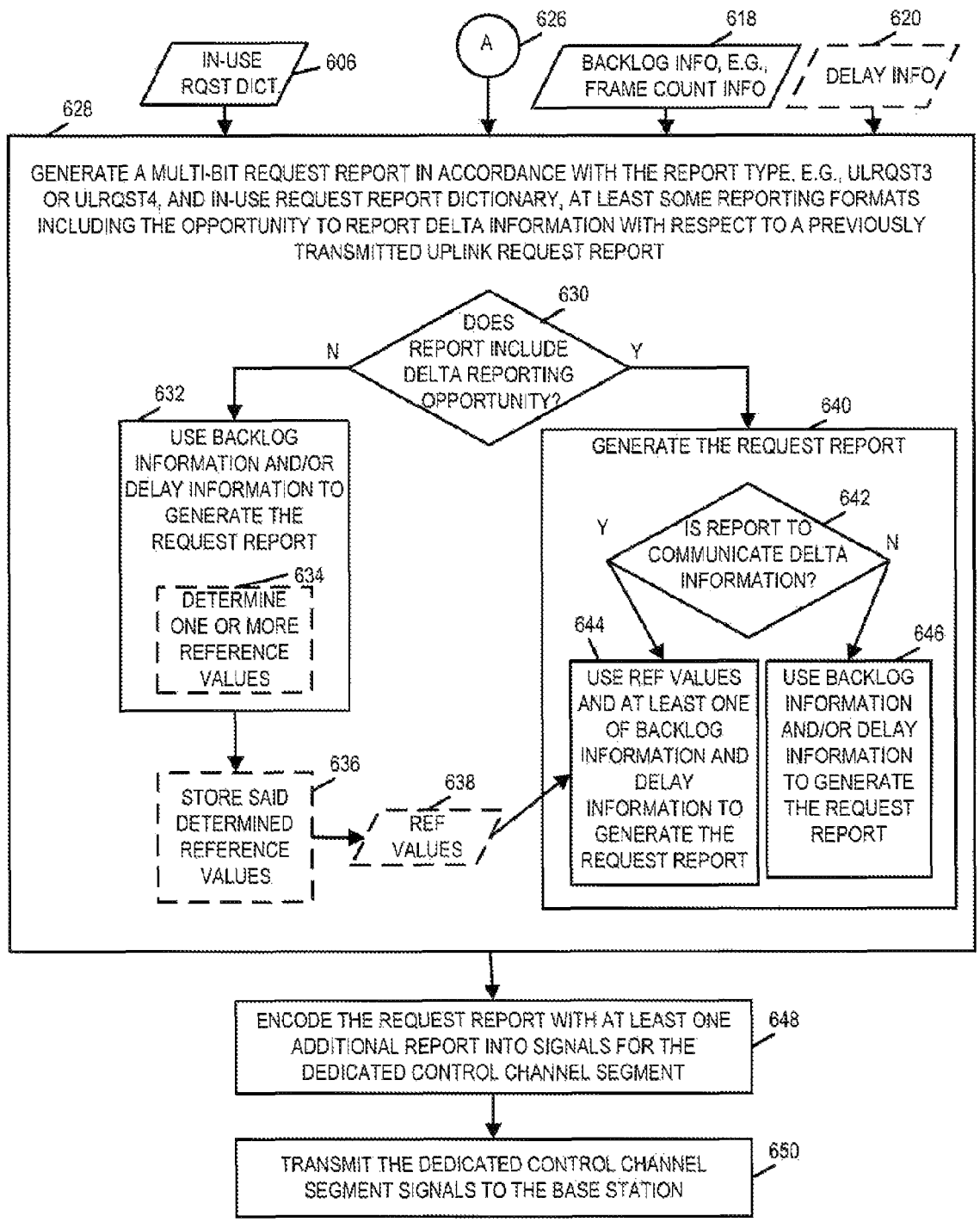

FIG. 6 comprising the combination of FIG. 6A and FIG. 6B is a drawing of a flowchart 600 of an exemplary method of operating a wireless terminal in accordance with various embodiments. Operation of the method starts in step 602, where the wireless terminal is powered on and initialized. Operation proceeds from start step 602 to step 604, where the wireless terminal determines a default request dictionary, setting the in-use request dictionary 606 to the default request dictionary. Operation proceeds from step 604 to steps 608 and step 610.

In step 610, the wireless terminal checks on an ongoing basis as to whether the in-use request dictionary should be changed. For example, the in-use request dictionary is sometimes changed in response to a command or request from a base station, or the wireless terminal can decide to change request dictionaries as a function of changing conditions at the wireless terminal, e.g., different types of uplink traffic to be communicated, different amount of uplink traffic to be communicated, different rates of uplink traffic to be transmitted, different quality of service level, different user, different priority, different latency considerations, and/or different mixture of types of uplink traffic.

If it is determined in step 610, that the request dictionary is to be changed, then operation proceeds from step 610 to step 612, where the in-use request dictionary 606 is updated, and then operation returns to step 610 for additional checking. If it is determined in step 610, that the request dictionary is not to be changed, then operation proceeds back to the input of step 610 for additional checking.

Returning to step 608, in step 608 the wireless terminal receives base station assigned wireless terminal identification information, e.g., a base station assigned wireless terminal On state identifier temporarily allocated to the wireless terminal, the base station assigned wireless terminal identification information associating particular dedicated control channel segments in a recurring dedicated control channel uplink timing and frequency structure to the wireless terminal for its use. Operation proceeds from step 608 to step 614 and step 616.

In step 616, the wireless terminal maintains, on an ongoing basis, backlog information and, optionally, delay information, corresponding to queued uplink traffic waiting to be transmitted. Backlog information 618, e.g., frame count information, and delay information 620, e.g., minimum time to transmission deadline information and/or maximum queuing delay information, are outputs of step 616.

Returning to step 614, in step 614, which is performed on an ongoing basis, the wireless terminal identifies dedicated control channel segments associated with the base station assigned wireless terminal identification information 614. Operation proceeds from step 614 to step 622, for each identified segment allocated to the wireless terminal.

In step 622, the wireless terminal checks as to whether or not the identified DCCH segment includes a multi-bit uplink request report. If the identified segment does not include a multi-bit uplink request report, then operation proceeds from step 622 to step 624, where the wireless terminal generates and transmits DCCH reports corresponding to the segment. If the identified segment does include a multi-bit uplink request report, then, operation proceeds via connecting node A 626 to step 628.

In step 628, the wireless terminal generates a multi-bit request report, in accordance with the report type, e.g., 3 bit uplink request report (ULRQST3) or 4 bit uplink request report (ULRQST4), and in-use request report dictionary, at least some reporting formats including the opportunity to report delta information with respect to a previously transmitted uplink request report. Step 622, includes sub-steps 630, 632, 640, and, optionally sub-step 636.

In sub-step 630, the wireless terminal checks as to whether or not the report to be generated is using a format which includes a delta reporting opportunity. If the report is not using a format including a delta reporting opportunity, operation proceeds form sub-step 630 to sub-step 632. If the report is using a format including a delta reporting opportunity, operation proceeds from sub-step 630 to sub-step 640.

In sub-step 632, the wireless terminal uses backlog information 618 and/or delay information 620 to generate the request report. For some formats, sub-step 632 includes sub-step 634, in which the wireless terminal determines one or more reference values, the reference values to be communicated additionally in the generated report. In embodiments, in which sub-step 634 is performed, operation proceeds from sub-step 632 to sub-step 636. In sub-step 636, the wireless terminal stores said determined reference values 638. Alternatively, the wireless terminal, in some embodiments, stores a report value, e.g., the information bit pattern conveyed by the report, and determines, e.g., using a look-up table, the reference values later, e.g., as part of report generation for a subsequent report, if needed.

Returning to sub-step 640, in sub-step 640, the wireless terminal generates the request report. Sub-step 640 includes sub-steps 642, 644 and 646. In sub-step 643, the wireless terminal determines whether or not the report is to communicate delta information. If the report is to communicate delta information, then operation proceeds from sub-step 642 to sub-step 644, where the wireless terminal uses reference values 638 and at least one of backlog information and delay information to generate the request report. In sub-step 646, the wireless terminal uses backlog information and/or delay information to generate the request report. Operation proceeds from step 628 to step 648, in which the wireless terminal encodes the request report with at least one addition report into signals for the dedicated control channel segment. Then, the step 650, the wireless terminal transmits the dedicated control channel segment signals to the base station.

Consider that in-use request dictionary is that of FIG. 12/FIG. 13, in that case, the 3 bit uplink request report (ULRQST3) includes the opportunity to communicate delta information, $d_{123}$, corresponding to each of the potential bit patterns, while the 4 bit uplink request report (ULRQST4) determines reference values, $N_{123}$ and g. Alternately, consider that in-use request dictionary is that of FIG. 16/FIG. 17, in that case, the 4 bit uplink request report (ULRQST4) includes the opportunity to communicate delta information, $\Delta$, corresponding to bit patterns 0110, 0111, 1000, 1001 and 1010, while the 3 bit uplink request report (ULRQST3) determines reference values, $N^{min}$. Alternately, consider that in-use request dictionary is that of FIG. 19/FIG. 20, in that case, the 3 bit uplink request report (ULRQST3) includes the opportunity to communicate delta information, $\Delta$, corresponding to each of the potential bit patterns, while the 4 bit uplink request report (ULRQST4) determines reference values, $N_T^{min}$ and g.

FIG. 7 is a drawing 700 of exemplary uplink dedicated control channel (DCCH) segments in an exemplary uplink timing and frequency structure in an exemplary orthogonal frequency division multiplexing (OFDM) multiple access wireless communications system. The uplink dedicated control channel is sued to send Dedicated Control Reports (DCR) from wireless terminals to base stations. Vertical axis 702 plots logical uplink tone index while horizontal axis 704 plots the uplink index of the halfslot within a beaconslot. In this example, an uplink tone block includes 113 logical uplink tones indexed (0, . . . , 112); there are seven successive OFDM symbol transmission time periods within a halfslot, 2 additional OFDM symbol time periods followed by 16 successive half-slots within a superslot, and 8 successive superslots within a beacon slot. The first 9 OFDM symbol transmission time periods within a superslot are an access interval, and the dedicated control channel does not use the air link resources of the access interval.

The exemplary dedicated control channel is subdivided into 31 logical tones (uplink tone index 81 706, uplink tone index 82 708, . . . , uplink tone index 111 710). Each logical uplink tone (81, . . . , 111) in the logical uplink frequency structure corresponds to a logical tone indexed with respect to the DCCH channel (0, . . . , 30).

For each tone in the dedicated control channel there are 40 segments in the beaconslot corresponding to forty columns (712, 714, 716, 718, 720, 722, . . . , 724). The segment structure repeats on a beaconslot basis. For a given tone in the dedicated control channel there are 40 segments corresponding to a beaconslot 728; each of the eight superslots of the beaconslot includes 5 successive segments for the given tone. For example, for first superslot 726 of beaconslot 728, corresponding to tone 0 of the DCCH, there are five indexed segments (segment [0][0], segment [0][1], segment [0][2], segment [0][3], segment [0][4]). Similarly, for first superslot 726 of beaconslot 728, corresponding to tone 1 of the DCCH, there are five indexed segments (segment [1][0], segment [1][1], segment [1][2], segment [1][3], segment [1][4]). Similarly, for first superslot 726 of beacon slot 728 corresponding to tone 30 of the DCCH, there are five indexed segments (segment [30][0], segment [30][1], segment [30][2], segment [30][3], segment [30][4]).

In this example each segment, e.g., segment [0][0], comprises one tone for 3 successive half-slots, e.g., representing an allocated uplink air link resource of 21 OFDM tone-symbols. In some embodiments, logical uplink tones are hopped to physical tones in accordance with an uplink tone hopping sequence such that the physical tone associated with a logical tone may be different for successive half-slots, but remains constant during a given half-slot.

Each logical tone of the dedicated control channel may be assigned by the base station to a different wireless terminal using the base station as its current point of attachment. For example, logical tone (706, 708, . . . , 710) may be currently assigned to (WT A 730, WT B 732, . . . , WT N' 734), respectively.

Each uplink DCCH segment is used to transmit a set of Dedicated Control Channel Reports (DCRs). A list of exemplary DCRs is given in table 800 of FIG. 8. First column 802 of table 800 describes abbreviated names used for each exemplary report. The name of each report ends with a number which specifies the number of bits of the DCR. Second column 804 of table 800 briefly describes each named report. Third column 806 identifies indexed segments in which the reports are conveyed in accordance with an exemplary reporting structure.

FIG. 9 is a drawing 999 illustrating an exemplary reporting format information in an exemplary beaconslot for a given DCCH tone, e.g., corresponding to a wireless terminal. In FIG. 9, each block (900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939) represents one segment whose index s2 (0, . . . , 39) is shown above the block in rectangular region 940. Each block, e.g., block 900 representing segment 0, conveys 6 information bits; each block comprises 6 rows corresponding to the 6 bits in the segment, where the bits are listed from the most significant bit to the least significant bit downwards from the top row to the bottom row as shown in rectangular region 943.

An exemplary wireless communications system supports one or more request dictionaries. On request dictionary may include a first set of bit mapping definition information for the 1 bit uplink request report, the 3 bit uplink request report and 4 bit uplink request reports, ULRQST 1, ULRQST3 and ULRQST4 of table 800; while another request dictionary may include a different set of bit mapping definition information for at least one of the 1 bit uplink request report, 3 bit uplink request report and 4-bit uplink request reports of table 800. A wireless terminal supporting multiple alternative request dictionaries can transmit uplink request reports using one of its supported multiple alternative request dictionaries. In some embodiments, the request dictionary selected to be used by the wireless terminal depends on the active traffic flows at the wireless terminal.

In some embodiments, the wireless terminal can, and sometimes does, perform the selection of which request dictionary to use at a given time. In some embodiments, another node, e.g., a base station, can, and sometimes does, performs the selection of which request dictionary to use corresponding to a wireless terminal at a given time. Regardless of whether the wireless terminal or the base station selects a request dictionary to use for a given wireless terminal during a given time, there is an understanding between the base station and the wireless terminal as to which request dictionary is being used, e.g., via signaling exchanged between the base station and wireless terminal, such that both the base station and wireless terminal are aware and in agreement of the request dictionary being used.

Different request dictionaries are structured to accommodate different reporting needs, thus facilitating more efficient reporting for requests than would otherwise be possible if only one dictionary was available. In some embodiments, a wireless terminal supports a plurality of different request dictionaries for uplink request reports, at least some of the different request dictionaries include a format conveying backlog information and delay information and at least some of the request dictionaries include a format conveying backlog information without delay information. In some embodiments, a wireless terminal supports a plurality of request dictionaries, at least some of the different request dictionaries including a format conveying delta backlog information with request to a previously transmitted backlog report.

Figure 10:
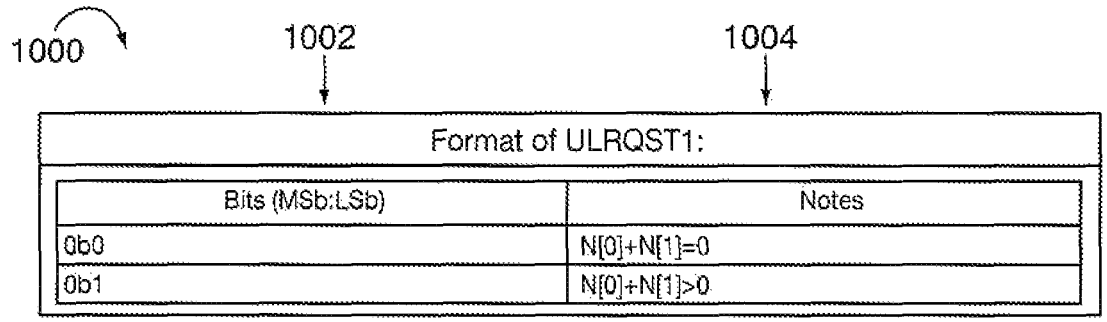
FIG. 10 is a drawing of an information to bit pattern mapping table describing format for a 1 bit uplink request report in accordance with a first exemplary request dictionary.

Exemplary request dictionary formats which are structured, for at least one report type, e.g., an ULRQST3 or ULRQST4 report to convey delta backlog information with respect to a previously communicated request report shall be described. It should be appreciated that a wireless terminal may, and sometimes does, also include other request dictionaries which do not convey delta backlog information with respect to a previously communicated request report An exemplary request dictionary, Request dictionary 1, including a format conveying backlog information without delay information and supporting the communication of delta backlog information will now be described. Request dictionary 1 reports backlog information corresponding to four request groups, with N[0] representing a frame count of backlog for request group 0, N[1] representing a frame count of backlog for request group 1, N[2] representing a frame count of backlog for request group 2, and N[3] representing a frame count of backlog for request group 3. In an exemplary embodiment, for request dictionary with reference number=1 the WT uses an ULRQST1 according to Table 1000 of FIG. 10 to report N[0]+N[1]. Table 1000 is an exemplary format for an ULRQST1 report. First column 1002 indicates the two possible bit patterns that may be conveyed while second column 1004 indicates the meaning of each bit pattern. If the bit pattern is 0, that indicates that there are no MAC frames that the WT intends to transmit in either request group 0 or request group 1. If the bit pattern is 1, that indicates that the WT has at least one MAC frame in request group 0 or request group 1 that the WT intends to communicate.

At a given time, the WT uses only one request dictionary. When the WT just enters the ACTIVE state, the WT uses the default request dictionary. To change the request dictionary, the WT and the base station uses an upper layer configuration protocol. When the WT migrates from the ON state to the HOLD state, the WT keeps the last request dictionary used in the ON state so that when the WT migrates from the HOLD state to the ON state later, the WT continues to sue the same request dictionary until the request dictionary is explicitly changed. However, if the WT leaves the ACTIVE state, then the memory of the last request dictionary used is cleared.

To determine an ULRQST3 or ULRQST4 corresponding to request dictionary with reference number=1, the WT first calculates the following two parameters, y and z, in accordance with table 1100 and then uses request dictionary with reference number=1. Denote by x the value (in dB) of the most recent 5 bit uplink transmission power backoff report (ULTXBKF5) report, and by $b_0$ the value in (dB) of the most recent generic 4 bit downlink beacon ratio report (DLBNR4). The WT further determines an adjusted generic DLBNR4 report value b as follows: $b=b_0-$ulTCHrateFlashAssignment- Offset, where minus is defined in the dB sense. The base station sector broadcasts the value of ulTCHrateFlashAssignmentOffset in a downlink broadcast channel. The WT uses ulTCHrateFlashAssignmentOffset equal to 0 dB until the WT receives the value from the broadcast channel.

Figure 11:
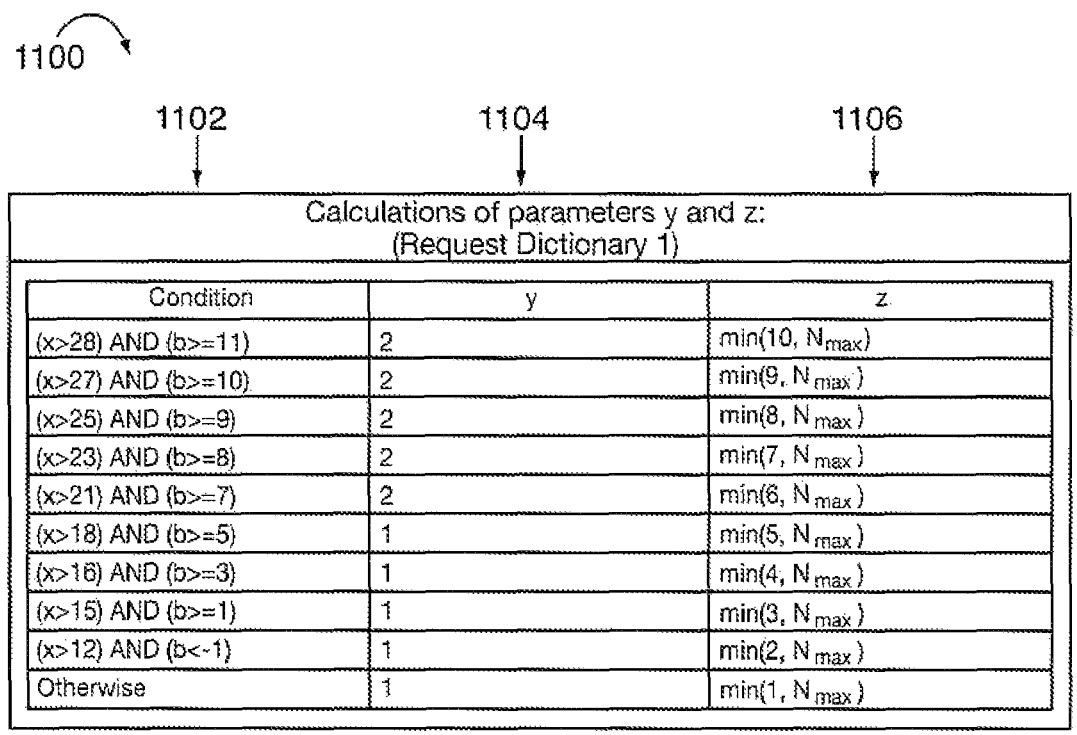
FIG. 11 is a drawing of an exemplary table used to determine control factors utilized in determining report values for 3 and 4 bit uplink request reports when using the exemplary first request dictionary corresponding to FIG. 12 and FIG. 13.

FIG. 11 is an exemplary table 1100 used to calculate control parameters y and z corresponding to request dictionary with reference number=1. First column 1102 lists a condition; second column 1104 lists the corresponding value of output control parameter y; third column 1106 lists the corresponding value of output control parameter z. Given x and b, the WT determines y and z as those from the first row in Table 1100 of FIG. 11 for which the condition in the first column is satisfied. For example, if x=17 and b=3, then z=min $(4, N_{max})$ and y=1. Denote $R_{max}$ the highest rate option that the WT can support, and $N_{max}$ the number of MAC frames at that highest rate option. The WT uses an ULRQST3 or ULRQST4 to report the actual N[0:3] of the MAC frame queues according to a request dictionary.

The exemplary request dictionary reference number=1 shows that any ULRQST4 or ULRQST3 report may not completely include the actual N[0:3]. A report is in effect a quantized version of the actual N[0:3].

Table 1200 of FIG. 12 and Table 1300 of FIG. 13 define an ULRQST4 report format and an ULRQST3 report format for an exemplary request dictionary with the reference number equal to 1. Define $d_{123}$=cell $(((N[1]+N[2]+N[3]-N_{123,min})/(y*g))$, where $N_{123,min}$ and g are variables determined by the most recent ULRQST4 report as per Table 1200. FIG. 12 is a table 1200 identifying bit format and interpretations associated with each of 16 bit patterns for a four bit uplink request, ULRQST4, corresponding to an exemplary first request dictionary (RD reference number=1). In some embodiments, the request dictionary with reference number=1 is the default request dictionary. First column 1202 identifies the bit pattern and bit ordering, most significant bit to least significant bit. Second column 1204 identifies the interpretation associated with each bit pattern. FIG. 13 is a table 1300 identifying bit format and interpretations associated with each of 8 bit patterns for a three bit uplink request, ULRQST3, corresponding to an exemplary first request dictionary (RD reference number=1). First column 1302 identifies the bit pattern and bit ordering, most significant bit to least significant bit. Second column 1304 identifies the interpretation associated with each bit pattern. Each bit pattern of the format of ULRQST3 for request dictionary 1 conveys an indication as to whether or not request group 0 has any backlog and a delta backlog value, $d_{123}$, which are jointly coded.

An exemplary request dictionary including a format conveying backlog information and delay information and including at least one report format including the opportunity to convey delta backlog information with respect to a previously communicated request report will now be described. In various embodiments, when using some request dictionaries a wireless terminal provides delay information for uplink traffic backlog. In order to enable a base station (BS) to provide adequate quality of service (QoS) in the uplink the wireless terminal (WT), in some embodiments, periodically transmits control information to the BS. For example, this control information includes, in some embodiments, of one or more of the following: amount of backlog, i.e., queue length, at the WT, power availability at the WT and information pertaining to interference management, such as, e.g., path loss ratio or beacon ratio reports. However, a scheduler, in addition to the information listed above, could also beneficially use information related to delay in order to make timely decisions when scheduling delay-sensitive traffic, for at least some types of traffic flows. Examples of such delay-sensitive traffic, in which a request dictionary including delay information would be beneficial, include voice, gaming and other interactive applications.

Delay information can, in some embodiments, does take one of the following two forms. (1) The maximum queuing delay across each of the packets in the WT's queue. In the case where the WT has multiple queues, each for a different traffic flow, the maximum could, in some embodiments, be computed across the packets in one or more queues. Note that each of these queues could represent traffic with different QoS requirements. Typically, this maximum would be calculated for packets that belong to delay-sensitive traffic flows. (2) The minimum time remaining to scheduling deadline across each of the packets in the WT's queue. Once again, if the WT has multiple queues, each for a different traffic flow, the minimum could, in some embodiments, be calculated for packets with latency or delay constraints.

The delay information itself can be reported in several ways. In an exemplary system, e.g., an exemplary OFDM wireless communications system, for example, the delay information can be transmitted using request dictionaries. An exemplary request dictionary, in some exemplary embodiment, includes a plurality of different bit size request reports, e.g., the exemplary request dictionary includes a 1 bit, a 3-bit and a 4-bit request report. Each of these reports is used to provide information pertaining to the backlog across traffic flows at the WT.

In some embodiments in which delay information is to be communicated, a 1-bit report, for example, can be used to simply indicate the presence of traffic with time remaining to deadline less than T ms. For example, T could equal 20 ms. With respect to exemplary request dictionary 2, let D denote the minimum time remaining, in milliseconds, to the scheduling deadline for each of the packets in the WT's queues; let N denote the total backlog at the WT, e.g., a MAC frame count.

Figure 15:
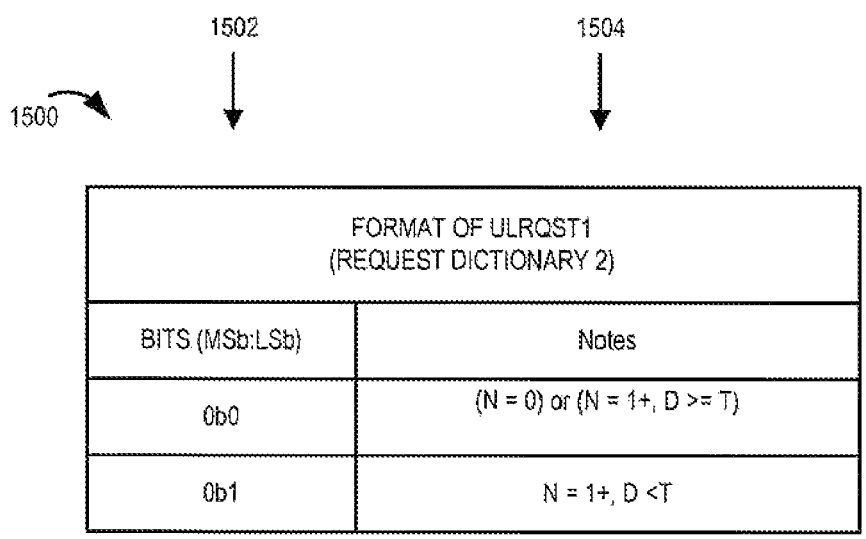
FIG. 15 is a drawing of an information to bit pattern mapping table describing format for a 1 bit uplink request report in accordance with a second exemplary request dictionary.
Figure 18:
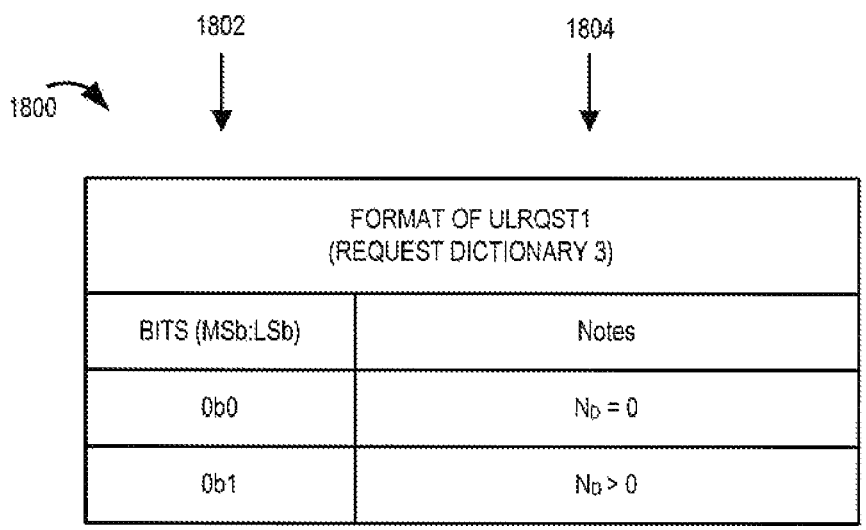
FIG. 18 is a drawing of an information to bit pattern mapping table describing format for a 1 bit uplink request report in accordance with a third exemplary request dictionary.

Table 1500 of FIG. 15 illustrates an exemplary 1 bit-uplink request report ULRQST 1 format that may be part of exemplary request dictionary 2. First column 1502 lists the potential bit patterns for the ULRQST1 report and second column 1054 lists the information conveyed corresponding to a bit pattern. The remaining report types, e.g., ULRQST3 and ULRQST4 of the request dictionary 2 are, e.g., used to provide more detailed backlog information, such as time remaining to deadline and total backlog, for the traffic flows. More precisely, each of these request reports could be used to convey one or both of deadline and total backlog information.

The 3-bit and 4-bit report formats corresponding to request dictionary 2 will now be described. In one illustrative example of a request dictionary, request dictionary 2, as represented by Table 1600 of FIG. 16 and Table 1700 of FIG. 17, the WT transmits total backlog information in the 3-bit report. The 4-bit report, on the other hand is used to transmit either delay information and/or backlog information. In this exemplary embodiment, the 3-bit report depends on two control factors, y and z, which, in turn, depend on a previous power report, e.g., the last reported uplink DCCH backoff report, x, and a previous interference report, e.g., the last reported beacon ratio report, $b_{actual}$. The WT then calculates b, the "adjusted generic beacon ratio", to be equal to $b_{actual}$−BEACON_RATIO_OFFSET. Finally, let $R_{max}$ be the maximum rate option that the WT can support, and $N_{max}$ be the number of MAC frames corresponding to that rate option. An example of information used for determining exemplary control factors y and z is shown in Table 1400. In Table 1400, first column 1402 lists various test conditions; second column 1404 lists corresponding values for control factor y for each condition; second column 1404 lists corresponding values for control factor y for each condition; third column 1406 lists corresponding values for control factor z corresponding for each condition. In Table 1400, given x and b, the values of y and z should be taken as those from the first row, proceeding from top to bottom, for which the condition in the first column is satisfied.

In the 4-bit report of the format of table 1700 of FIG. 17, the WT transmits the time remaining to deadline information D whenever $D \leq T^{max}$ and there is at least some backlog. For example, $T^{max}=100$ ms. Otherwise, it transmits backlog information. Define $$\Delta = \left\lceil \frac{N - N^{min}}{y} \right\rceil,$$

where $N^{min}$ is determined based on the value of N at the time of the last 3-bit report, using Table 1600 of FIG. 16. Thus for bit patterns in the set of {0110, 0111, 1000, 1001, 1010} for ULRQST4 using request dictionary 2 format, $\Delta$ is communicated, which is a function of backlog information communicated in a previous 3 bit uplink request report ULRQST3, where the value of $N^{min}$ is the reference parameter value which was previously communicated.

An additional exemplary request dictionary, request dictionary 3, shall be described which uses three different bit size request reports for uplink traffic, ULRQST 1, ULRQST 3 and ULRQST4, and includes at least one report format including the opportunity to convey delta backlog information with respect to a previously communicated request report will now be described.

The WT uses an ULRQST1, ULRQST3 or ULRQST4 to report the status of the MAC frame queues at the WT Transmitter.

The WT transmitter maintains MAC frame queues, which buffers the MAC frames to be transmitted over the link. The MAC frames are converted from the LLC frames, which are constructed from packets of upper layer protocols. Any packet may belong to one of a predetermined number of designated transmission streams. In this exemplary embodiment consider an implementation with 16 transmission streams, if a packet belongs to one stream, then all MAC frames of that packet also belong to that stream.

The WT reports the number of MAC frames in the 16 streams that the WT may intend to transmit. In the ARQ protocol, those MAC frames shall be those marked as "new" or "to be retransmitted". The WT should maintain a vector of sixteen elements N[0:15] and shall maintain scalars $N_T$ and $N_D$. For k=0:15, N[k] represents the number of MAC frames that the WT intends to transmit in stream k. Furthermore, $N_T=N[0]+N[1]+N[2]+\ldots+N[15]$, and $N_D$=number of MAC frames with time remaining to transmission deadline$\leq T_M$, where $T_M$=20 ms. The WT should report information about $N_T$ and/or $N_D$ to the base station sector so that the base station sector can utilize the information in an uplink (UL) scheduling algorithm to determine the assignment of uplink traffic channel (UL.TCH) segments.

For Request dictionary 3, the WT uses an ULRQST1 to report $N_D$ according to Table 1900 of FIG. 19. First column 1902 describes the alternative bit patterns, second column 1904 describes the information conveyed corresponding to each bit pattern. If the ULRQST1 report is set to information bit pattern=0, then the report conveys that the wireless terminal does not have any MAC frames with time remaining to transmission deadline$\leq$20 msec waiting to be transmitted. If the ULRQST1 report is set to information bit pattern=1, then the report conveys that the wireless terminal has at least one MAC frame with time remaining to transmission deadline$\leq$20 msec waiting to be transmitted.

The WT uses ULRQST3 or ULRQST4 to report one or more of $N_T$ and $N_D$ according to a request dictionary 3. The request dictionary 3 shows that any given instance of a ULRQST3 or ULRQST4 report may not completely contain the actual values of $N_T$ or $N_D$. A report is in effect a quantized version of the actual values of $N_T$ or $N_D$. A general guideline is that the WT should send a report to minimize the discrepancy between the reported and actual values of $N_T$ or $N_D$. However, the WT has the flexibility of determining a report to benefit the WT the most. For example, when the WT is using request dictionary 3, the WT may use ULRQST4 to report $N_T$ in some cases and $N_D$ in others. Furthermore, in stances where the WT reports $N_T$, it may not automatically imply that $N_D=0$.

Figure 14:
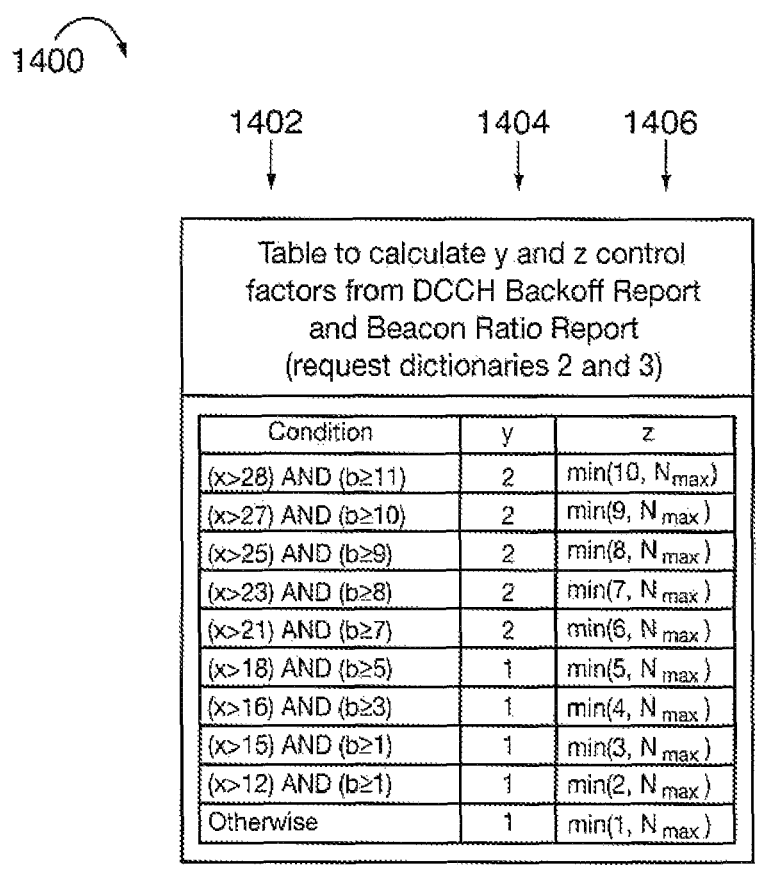
FIG. 14 is a drawing of an exemplary table sued to determine control factors utilized in determining report values for 3 and 4 bit uplink request reports when using the exemplary second and third request dictionaries corresponding to FIGS. 16-17 and 19-20.

To determine ULRQST3 and ULRQST4 corresponding to request dictionary 3, the WT first calculates the following two parameters, y and z, e.g., in accordance with table 1400 of FIG. 14 and then uses request dictionary bit mapping information. Denote by x the value (in dB) of the most recent ULTXBKF5 report, and by $b_0$ the value (in dB) of the most recent generic DLBNR4 report. An exemplary range for x is 6.5 dB to 40 dB. An exemplary range for $b_0$ is −3 dB to 26 dB. The WT further determines an adjusted generic DLBNR4 report value b as follows: $b=b_0$−ulTCHrateFlashAssignmentOffset, where minus is defined in the dB sense. Given x and b, the WT determines y and z as those from the first row in table 1400 of FIG. 14 for which the condition in the first column is satisfied. For example, if x=17 and b=1, then z=min(3, $N_{max}$) and y=1. Denote $R_{max}$ the highest rate option that the WT can support, and $N_{max}$ the number of MAC frames that can be transmitted in that rate option.

Table 1900 of FIG. 19 and Table 2000 of FIG. 20 define reports formats included in exemplary request dictionary 3. Table 1900 defines exemplary request dictionary 3 format of 4 bit uplink request report (ULRQST4), which communicates backlog information. First column 1900 includes the 16 potential bit patterns that may be conveyed by the ULRQST4 report, while second, third, and fourth columns (1904, 1906, 1908), respectively, identify corresponding information conveyed by a particular bit pattern. Second column 1904 provides frame count information corresponding to either $N_T$ or $N_D$; third column 1906 provides a reference variable, $N_T^{min}$, value indicative of backlog; fourth column 1908 provides another reference variable, g, value indicative of backlog.

Note that the request dictionary 3 format does not directly communicate a delay value; however request dictionary 3 does support the indirect communication of delay information by means of using two backlog count variables, $N_T$ and $N_D$.

Table 2000 defines exemplary request dictionary 3 format of 3 bit uplink request report (ULRQST3), which communicates backlog information. First column 2002 includes the 9 potential bit patterns that may be conveyed by the ULRQST3 report, while second column 2004 provides frame count information corresponding to $N_T$ and/or $N_D$ including backlog information referenced with respect to a previously communicated ULRQST4 report. In exemplary format each bit patterns conveys an indication as to whether or not there are any frames in backlog $$\text{Define } \Delta = \left\lceil \frac{N_T - N_T^{min}}{y * g} \right\rceil,$$

where $N_T^{min}$ and g are variables determined by the most recent ULRQST4 as per Table 1900 of FIG. 19. Each bit pattern also communicates an indication as to whether or not there are any frames counted in variable $N_D$ backlog, the indication being jointly coded with the delta backlog information.

FIG. 21 is a drawing illustrating exemplary sequences of multi-bit uplink request reports corresponding to different request dictionaries and illustrating interdependency between reports. Time axis 2102 is provided to illustrate time ordering of the reports, the exact time relationship between subsequent request reports is not illustrated as the drawing is not drawn to scale.

The sequence of reports (2104, 2106, 2108, 2110, 2112, 2114), corresponding to a wireless terminal using request report dictionary 1, illustrates that a 3 bit uplink request report (2106, 2110, 2114) is referenced with respect to the most recently communicated 4 bit uplink request report (2104, 2108, 2112), respectively. ULRQST3 report 2106 communicates a value indicative of backlog $d_{123}$ 2120 which is determined as a function of the value $N_{123, min}$ 2116 and value of parameter g 2118 communicated via ULRQST4 report 2104. Similarly, ULRQST3 report 2110 communicates a value indicative of backlog $d_{123}$ 2126 which is determined as a function of the value $N_{123, min}$ 2122 and value of parameter g 2124 communicated via ULRQST4 report 2108. Similarly, ULRQST3 report 2114 communicates a value indicative of backlog $d_{123}$ 2132 which is determined as a function of the value $N_{123, min}$ 2128 and value of parameter g 2130 communicated via ULRQST4 report 2112.

The sequence of reports (2134, 2136, 2138, 2140, 2142, 2144), corresponding to a wireless terminal using request report dictionary 3, illustrates that a 4 bit uplink request report (2136, 2140, 2144) may be, and sometimes is, referenced with respect to the most recently communicated 4 bit uplink request report (2134, 2138, 2142), respectively. Each ULRQST3 report (2134, 2138, 2142) communicates a value $N^{min}$ (2146, 2150, 2154) indicative of backlog, which is available for use by the subsequent 4 bit uplink request report (2136, 2140, 2144). With respect to ULRQST4 report 2136, the wireless terminal has decided to communicate delay value D 2148 communicating delay information related to backlog; one of bit patterns 0001, 0010, 0011, 0100 and 0101 is communicated; and the report is not referenced with respect to the previous 3 bit uplink request report. With respect to ULRQST4 report 2140, the wireless terminal has decided to communicate a value indicative of backlog Δ 2152 which is determined as a function of the value $N^{min}$ 2150 communicated via ULRQST3 report 2138; one of bit patterns 0100, 0111, 1000, 1001 and 1010 is communicated. With respect to ULRQST4 report 2144, the wireless terminal has decided to communicate backlog information N/z 2156; one of bit patterns 0000, 1011, 1100, 1101, 1100 and 1111 is communicated; and the report is not referenced with respect to the previous 3 bit uplink request report.

The sequence of reports (2158, 2160, 2162, 2164, 2166, 2168), corresponding to a wireless terminal using request report dictionary 3, illustrates that a 3 bit uplink request report (2160, 2164, 2168) is referenced with respect to the most recently communicated 4 bit uplink request report (2158, 2162, 2166), respectively. ULRQST3 report 2160 communicates a value indicative of backlog Δ 2174 which is determined as a function of the value $N_T^{min}$ 2170 and value of parameter g 2172 communicated via ULRQST4 report 2158. Similarly, ULRQST3 report 2164 communicates a value indicative of backlog Δ 2180 which is determined as a function of the value $N_T^{min}$ 2176 and value of parameter g 2178 communicated of backlog Δ 2186 which is determined as a function of the value $N_T^{min}$ 2182 and value of parameter g 2184 communicated via ULRQST4 report 2166.

Control reports characterizing a wireless terminal's needs/condition can be useful in efficiently scheduling limited air link resources among competing users. Efficient utilization of control signaling bits can be an important factor in achieving a high data throughput in the communications system. It should be noted that in the examples using request dictionaries 1 and 3, the delta request reports utilize smaller fixed size reports than the reports which are not referenced with respect to a previous request report. However; in the example, using the request dictionary 2, the delta request report, report 2140, utilizes a fixed size report having a larger bit size than the bit size of the referenced report 2138. However, in the case of request dictionary 2, the ULRQST4 report format is shared to allow additional reporting alternatives, the communication of delay information and the communication of total backlog information, in addition to the delta reporting alternative.

Note that the bit sizes for the request reports in the examples above, e.g., 1 bit, 3 bit, 4 bit, are exemplary, and in other embodiments, different bit size request reports may be, and sometimes are used. For example, another exemplary set of request reports includes a 1 bit, 3 bit, and 5 bit size report.

While described in the context of an OFDM system, the methods and apparatus of various embodiments, are applicable to a wide range of communications systems including many non-OFDM and/or non-cellular systems.

In various embodiments nodes described herein are implemented using one or more modules to perform the steps corresponding to one or more methods, for example, transmitting a backlog report, selection of a request dictionary, selection of a reporting alternative for a particular request report, computation of delta information, generation of request reports in accordance with a determined in-use request dictionary, and/or recovery of request report information in accordance with a determined in-use request dictionary. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communication techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a communications device to communicate transmission backlog information, the method comprising:
    transmitting at a first point in time a first backlog report communicating backlog information about an amount of data waiting to be transmitted; and
    transmitting at a second point in time a second backlog report communicating additional backlog information, at least some of said additional information being communicated as a differential value computed using a value communicated by said first backlog report.

2. The method of claim 1, wherein said first backlog report is a first fixed size report and said second backlog report is a second fixed size report which includes fewer bits than said first fixed size report.

3. The method of claim 1,
    wherein said first backlog report is a first fixed size report and said second backlog report is a second fixed size report which includes more bits than said first fixed size report, the method further comprising:
    transmitting a third report of the same fixed size as said second backlog report, said third report communicating one of: a total backlog value and transmission delay information.

4. The method of claim 3,
    wherein said first, second and third reports are transmitted using dedicated time slots in a reporting structure; and
    wherein prior to transmitting said second report, said communications device selects, for said second report, to communicate a differential value from a plurality of selection alternatives including communicating a differential value, communicating a value indicative of total backlog, and communicating transmission delay information.

5. The method of claim 3, wherein prior to transmitting said third report, said communications device selects, for said third report, to communicate one of a value indicative of total backlog and transmission delay information from a plurality of selection alternatives including communicating a differential value, communicating a value indicative of total backlog, and communicating transmission delay information.

6. The method of claim 1, further comprising:
    communicating in said second report in addition to said differential value an indication as to whether or not there is at least one unit of data waiting to be transmitted with a first transmission deadline.

7. The method of claim 6, wherein said first transmission deadline is a predetermined transmission deadline.

8. The method of claim 7, wherein said predetermined transmission deadline is relative to a communication time corresponding to said second report transmission.

9. The method of claim 7, wherein one of said first and second reports is a 3 bit report and the other one of said first and second reports is a 4 bit report.

10. The method of claim 9, wherein said communications device is a mobile node and wherein said first and second reports are uplink traffic channel request reports.

11. A computer readable medium embodying machine executable instruction for controlling a communications device to implement a method, the method comprising:
    transmitting at a first point in time a first backlog report communicating backlog information about an amount of data waiting to be transmitted; and
    transmitting a second point in time a second backlog report communicating additional backlog information, at least some of said additional information being communicated as a differential value computed using a value communicated by said first backlog report.

12. The computer readable medium of claim 11, wherein said first backlog report is a first fixed size report and said second backlog report is a second fixed size report which includes fewer bits than said first fixed size report.

13. The computer readable medium of claim 11,
    wherein said first backlog report is a first fixed size report and said second backlog report is a second fixed size report which includes more bits than said first fixed size report, the computer readable medium further embodying machine executable instructions for:
    transmitting a third report of the same fixed size as said second backlog report, said third report communicating one of: a total backlog value and transmission delay information.

14. The computer readable medium of claim 13,
    wherein said first, second and third reports are transmitted using dedicated time slots in a reporting structure; and
    wherein said computer readable medium further embodies machine readable instructions for:
        performing a reporting alternative type selection prior to transmitting said second report, and wherein said selection selects for said second report, to communicate a differential value from a plurality of selection alternatives including communicating a differential value, communicating a value indicative of total backlog, and communicating transmission delay information.

15. The computer readable medium of claim 13, said computer readable medium further embodies machine executable instruction for:
    performing a reporting alternative selection prior to transmitting said third report, and said selection selects, for said third report, to communicate one of a value indicative of total backlog and transmission delay information from a plurality of selection alternatives including communicating a differential value, communicating a value indicative of total backlog, and communicating transmission delay information.

16. The computer readable medium of claim 11, further embodying machine executable instructions for:
    communicating in said second report in addition to said differential value an indication as to whether or not there is at least one unit of data waiting to be transmitted with a first transmission deadline.

17. A device comprising:
    a processor configured to:
        transmit at a first point in time a first backlog report, communicating backlog information about an amount of data waiting to be transmitted; and
        transmit at a second point in time a second backlog report communicating additional backlog information, at least some of said additional information being communicated as a differential value computed using a value communicated by said first backlog report.

18. The device of claim 17, wherein said first backlog report is a first fixed size report and said second backlog report is a second fixed size report which includes fewer bits than said first fixed size report.

19. The device of claim 17,
wherein said first backlog report is a first fixed size report and said second backlog report is a second fixed size report which includes more bits than said first fixed size report, and wherein said processor is further configured to:
transmit a third report of the same fixed size as said second backlog report, said third report communicating one of: a total backlog value and transmission delay information.

20. The device of claim 19, wherein said processor is further configured to:
transmit said first, second and third reports using dedicated time slots in a reporting structure; and
wherein said processor is further configured to:
select prior to transmitting said second report and wherein said processor selects, for said second report, to communicate a differential value from a plurality of selection alternatives including communicating a differential value, communicating a value indicative of total backlog, and communicating transmission delay information.

21. The device of claim 19, wherein said processor is further configured to:
select prior to transmitting said third report and wherein said processor selects, for said third report, to communicate one of a value indicative of total backlog and transmission delay information from a plurality of selection alternatives including communicating a differential value, communicating a value indicative of total backlog, and communicating transmission delay information.

22. The device of claim 17, wherein said processor is further configured to:
communicate in said second report in addition to said differential value an indication as to whether or not there is at least one unit of data waiting to be transmitted with a first transmission deadline.

23. A communications device comprising:
means for transmitting at a first point in time a first backlog report communicating backlog information about an amount of data waiting to be transmitted; and
means for transmitting at a second point in time a second backlog report communicating additional backlog information, at least some of said additional backlog information being communicated as a differential value computed using a value communicated by said first backlog report.

24. The communications device of claim 23, wherein said first backlog report is a first fixed size report and said second backlog report is a second fixed size report which includes fewer bits than said first fixed size report.

25. The communications device of claim 23, wherein said first backlog report is a first fixed size report and said second backlog report is a second fixed size report which includes more bits than said first fixed size report.

26. The communications device of claim 25, further comprising:
storage means including stored dedicated control channel structure information and wherein said first and second reports are transmitted using dedicated time slots in a reporting structure.

27. The communications device of claim 25, further comprising:
means for selecting between a plurality of alternative backlog information types which can be communicated, said alternative information types including at least two of a differential value, a value indicative of total backlog, and a transmission delay information value.

* * * * *